(12) United States Patent
Rothschild et al.

(10) Patent No.: US 11,448,606 B2
(45) Date of Patent: *Sep. 20, 2022

(54) SYSTEM, KIT, AND METHOD FOR X-RAY IMAGING WITH REMOVABLY ATTACHABLE DETECTOR ASSEMBLY

(71) Applicant: Viken Detection Corporation, Burlington, MA (US)

(72) Inventors: Peter J. Rothschild, Newton, MA (US); Howard D. Kellogg, Somerville, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,762

(22) Filed: Dec. 1, 2021

(65) Prior Publication Data
US 2022/0091054 A1  Mar. 24, 2022

Related U.S. Application Data

(63) Continuation of application No. 16/915,846, filed on Jun. 29, 2020, which is a continuation of application
(Continued)

(51) Int. Cl.
*G01N 23/20008* (2018.01)
*G01V 5/00* (2006.01)
*G01N 23/203* (2006.01)

(52) U.S. Cl.
CPC ..... *G01N 23/20008* (2013.01); *G01N 23/203* (2013.01); *G01V 5/0025* (2013.01);
(Continued)

(58) Field of Classification Search
CPC ....... G01N 2223/053; G01N 2223/301; G01N 2223/3301; G01N 23/20008; G01N 23/203; G01V 5/0025
See application file for complete search history.

(56) References Cited

U.S. PATENT DOCUMENTS

D724,716 S    3/2015  Guo
10,762,999 B2  9/2020  Kaszuba et al.
(Continued)

FOREIGN PATENT DOCUMENTS

CN    201340400 Y    11/2009
EP      2667184 A1   11/2013
WO   2016081881 A1    5/2016

OTHER PUBLICATIONS

International Search Report and Written Opinion for International Application No. PCT/US2019/016436, entitled "System and Kit for X-Ray Backscatter Imaging with Removable Detector," dated Apr. 10, 2019.
(Continued)

*Primary Examiner* — Chih-Cheng Kao
(74) *Attorney, Agent, or Firm* — Hamilton, Brook, Smith & Reynolds, P.C.

(57) ABSTRACT

An x-ray imaging system, and a corresponding kit and method, includes a movable x-ray imager that includes a first backscatter x-ray detector assembly. The system also includes a second backscatter x-ray detector assembly that is removably attachable with the movable x-ray imager. The movable x-ray imager and the second backscatter x-ray detector include complementary attachment features configured to secure, removably, the second backscatter x-ray detector assembly with the movable x-ray imager to form an attached arrangement having the second and first backscatter x-ray detectors fixedly oriented with respect to each other. The second backscatter x-ray detector assembly forms an outer loop defining an inner opening at which the movable x-ray imager is configured to be received for attachment of the second backscatter x-ray detector assembly with the movable x-ray imager to form the attached arrangement.

21 Claims, 16 Drawing Sheets

Related U.S. Application Data

No. 16/265,992, filed on Feb. 1, 2019, now Pat. No. 10,794,843.

(60) Provisional application No. 62/796,351, filed on Jan. 24, 2019, provisional application No. 62/625,526, filed on Feb. 2, 2018.

(52) U.S. Cl.
CPC ............... *G01N 2223/053* (2013.01); *G01N 2223/1016* (2013.01); *G01N 2223/301* (2013.01); *G01N 2223/3301* (2013.01); *G01N 2223/401* (2013.01); *G01N 2223/421* (2013.01)

(56) References Cited

U.S. PATENT DOCUMENTS

| | | | |
|---|---|---|---|
| 10,794,843 B2 * | 10/2020 | Rothschild ....... | G01N 23/20008 |
| 2011/0103548 A1 | 5/2011 | Bendahan | |
| 2012/0057670 A1 | 3/2012 | Luhta et al. | |
| 2012/0263276 A1 | 10/2012 | Schubert et al. | |
| 2013/0134930 A1 | 5/2013 | Konkle et al. | |
| 2013/0195248 A1 | 8/2013 | Rothschild et al. | |
| 2013/0208850 A1 * | 8/2013 | Schmitt ................ | G01N 23/203 378/4 |
| 2013/0208857 A1 * | 8/2013 | Arodzero ............. | G01V 5/0016 378/57 |
| 2013/0315368 A1 | 11/2013 | Turner | |
| 2016/0070006 A1 | 3/2016 | Konkle et al. | |
| 2017/0052125 A1 | 2/2017 | Georgeson et al. | |
| 2019/0043633 A2 | 2/2019 | Rothschild | |
| 2019/0242834 A1 | 8/2019 | Rothschild et al. | |
| 2020/0326291 A1 | 10/2020 | Rothschild et al. | |

OTHER PUBLICATIONS

U.S. Non-Final Office Action for U.S. Appl. No. 16/265,992, entitled "System and Kit for X-Ray Backscatter Imaging with Removable Detector," dated Apr. 16, 2020.

U.S. Notice of Allowance for U.S. Appl. No. 16/265,992, entitled "System and Kit for X-Ray Backscatter Imaging with Removable Detector," dated Jul. 31, 2020.

International Preliminary Report on Patentability dated Aug. 13, 2020 in PCT/US2019/016436, "System and Kit for X-Ray Backscatter Imaging with Removable Detector" (9 pages).

U.S. Final Office Action for U.S. Appl. No. 16/915,846, entitled "System and Method for X-Ray Backscatter Imaging with Removable Detector," dated Nov. 30, 2021.

U.S. Non-Final Office Action for U.S. Appl. No. 16/915,846, entitled "System and Method for X-Ray Backscatter Imaging with Removable Detector," dated May 14, 2021.

* cited by examiner

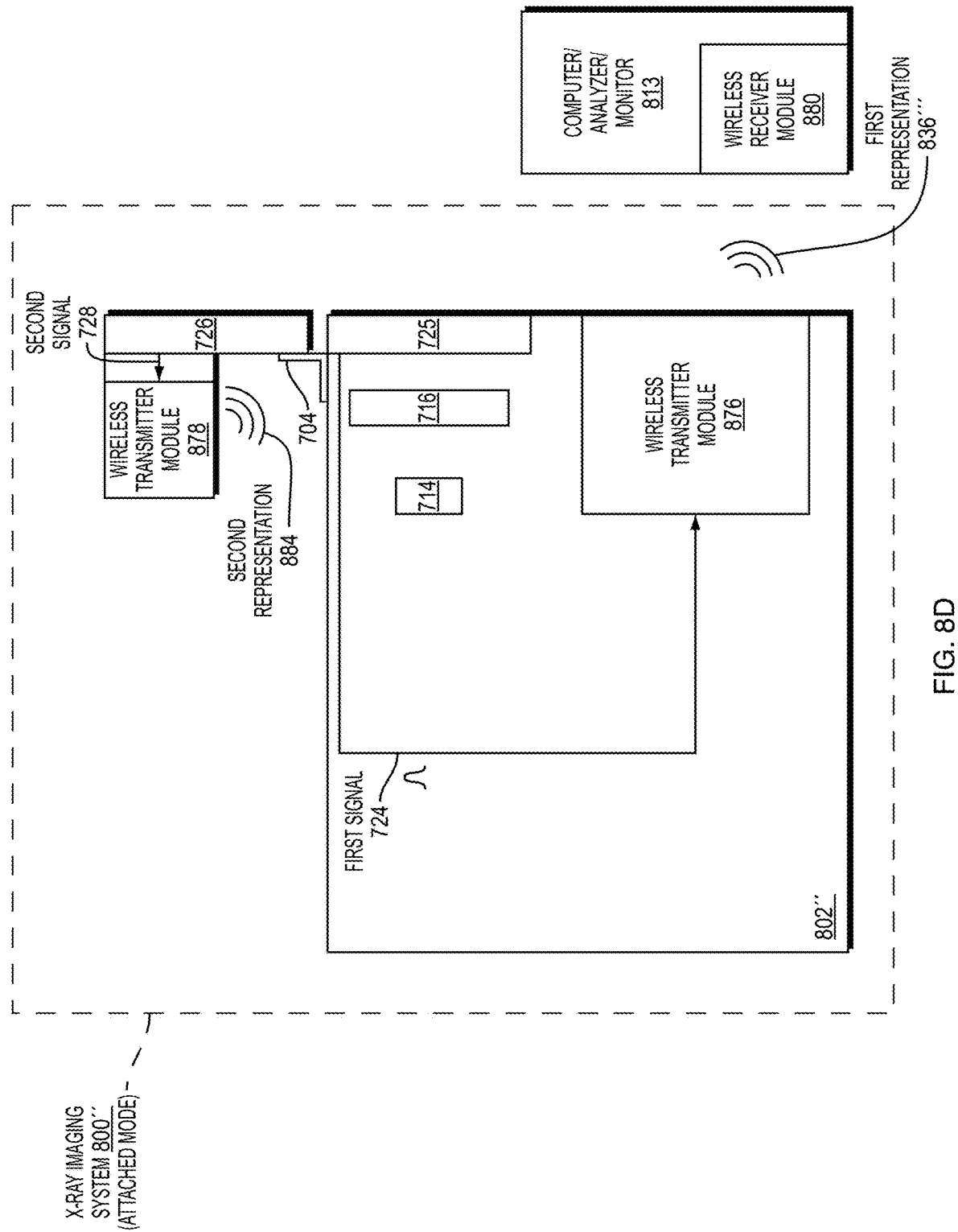

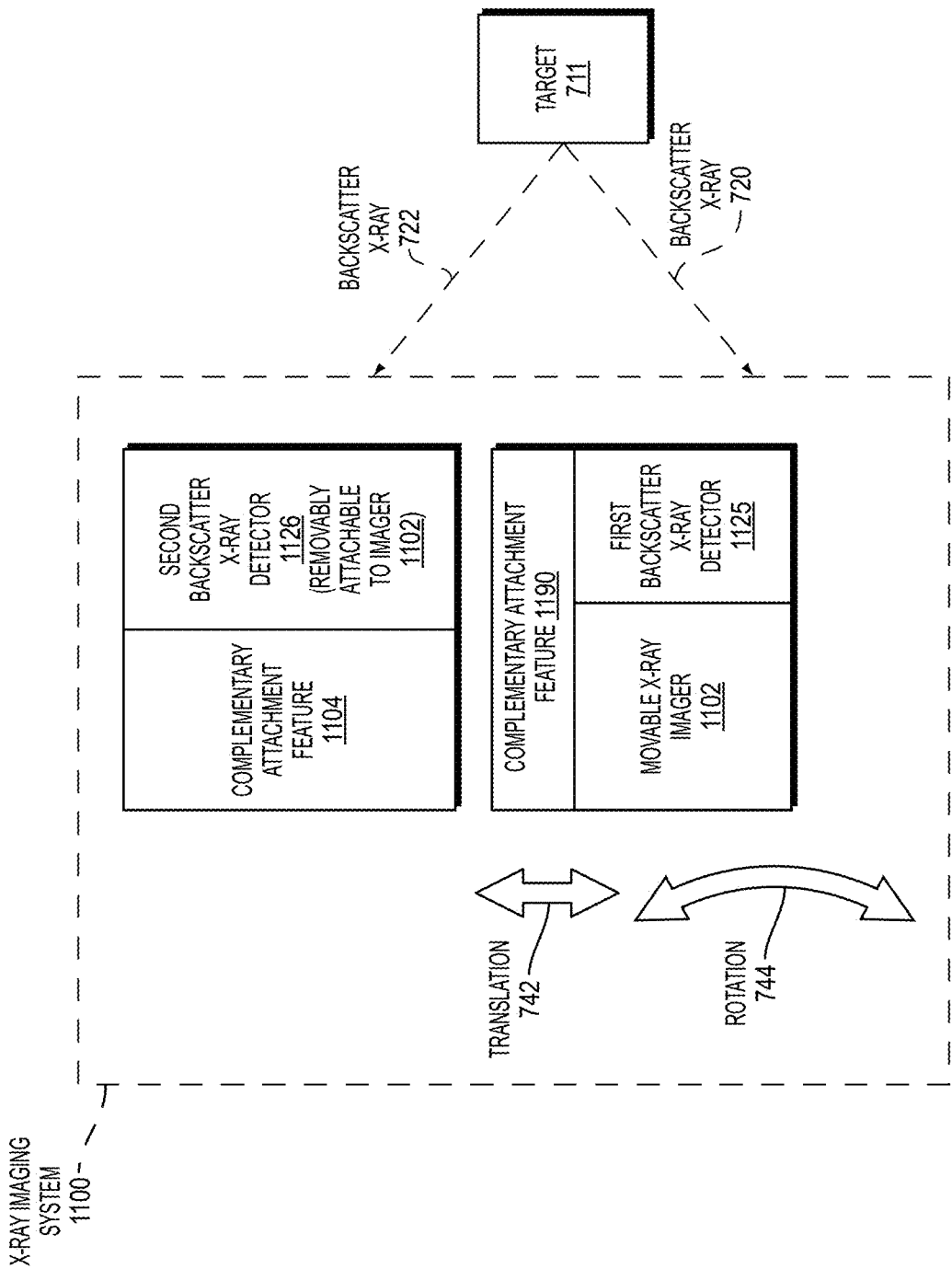

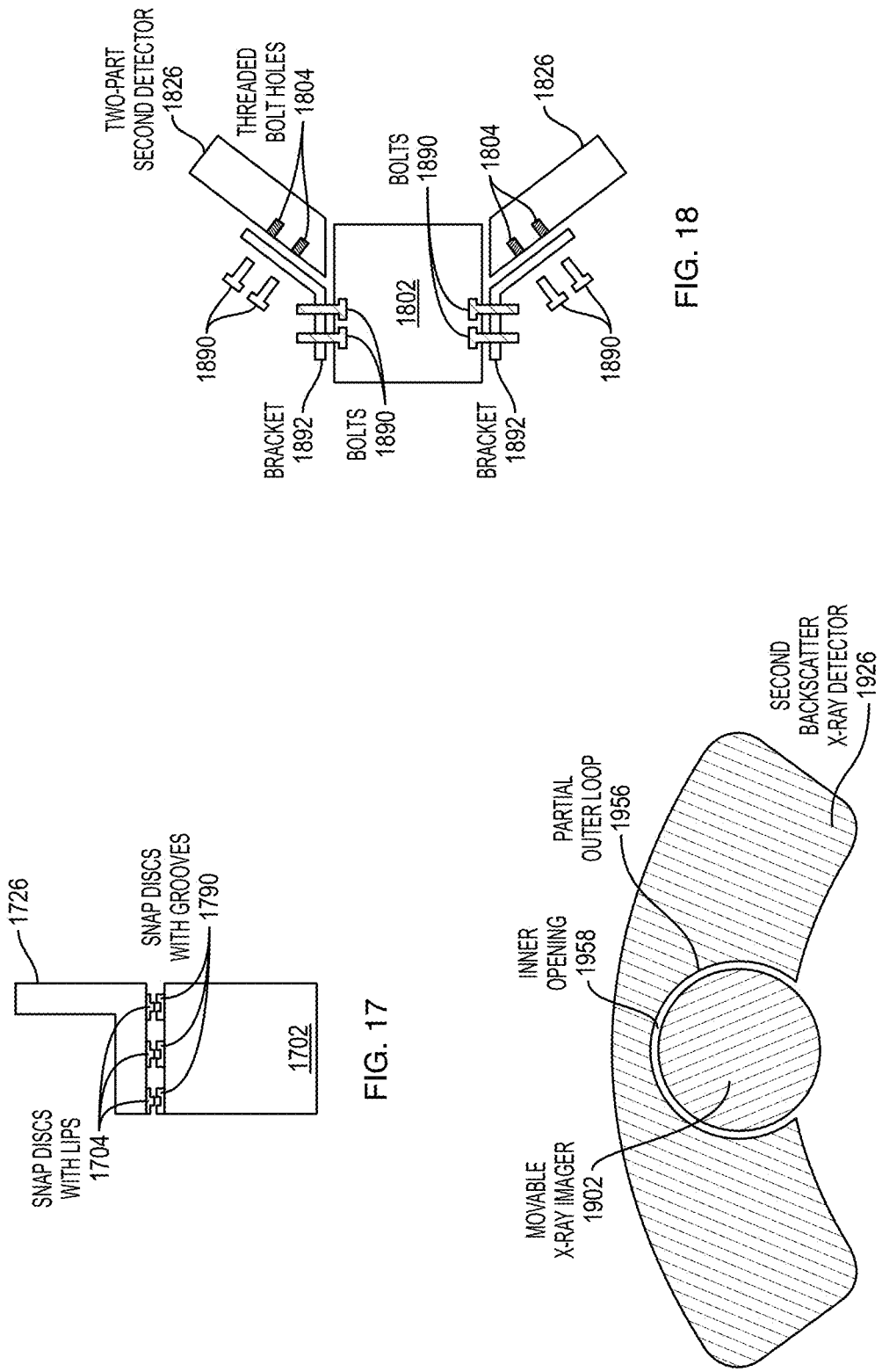

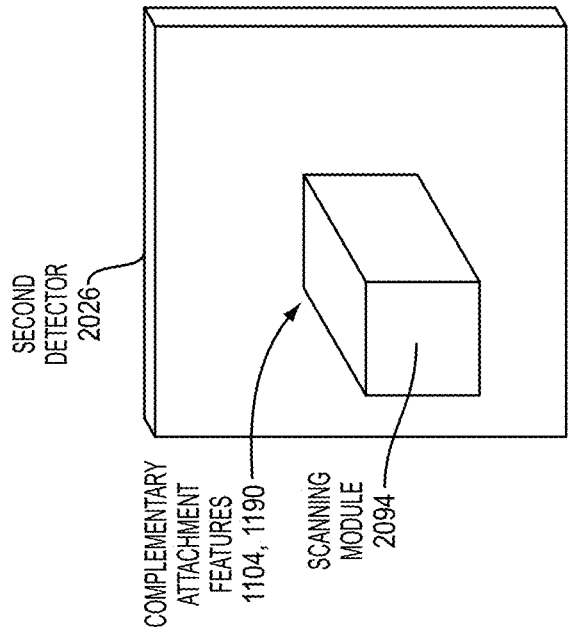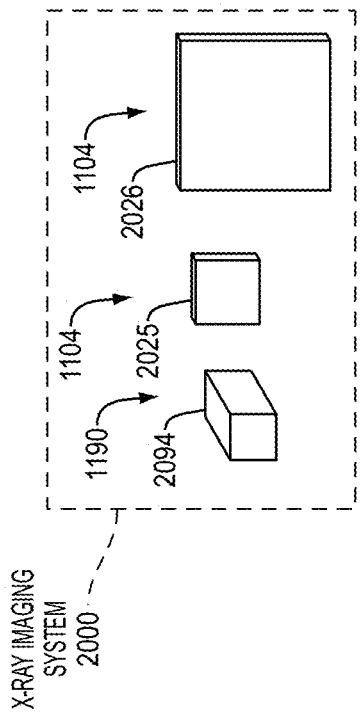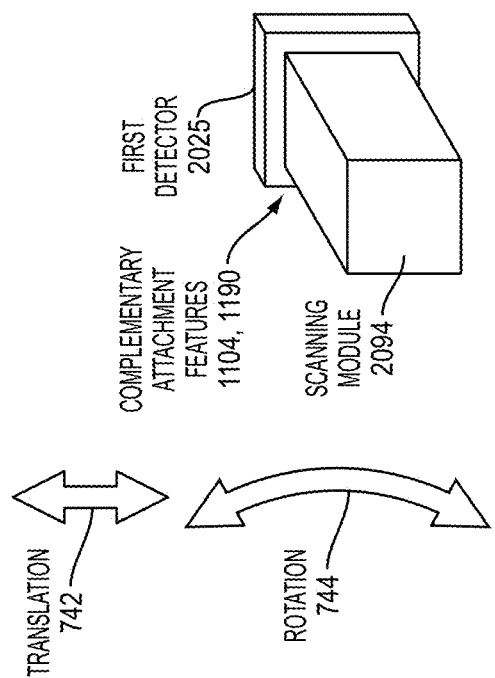

SYSTEM, KIT, AND METHOD FOR X-RAY IMAGING WITH REMOVABLY ATTACHABLE DETECTOR ASSEMBLY

RELATED APPLICATIONS

This application is a continuation of U.S. application Ser. No. 16/915,846, filed on Jun. 29, 2020, which is a continuation of U.S. application Ser. No. 16/265,992, filed on Feb. 1, 2019, now U.S. Pat. No. 10,794,843, which claims the benefit of U.S. Provisional Application No. 62/796,351, filed on Jan. 24, 2019; and also claims the benefit of U.S. Provisional Application No. 62/625,526, filed Feb. 2, 2018. The entire teachings of the above applications are incorporated herein by reference.

BACKGROUND

X-ray backscatter imaging has been used for detecting concealed contraband, such as drugs, explosives, and weapons, since the late 1980's. Unlike traditional transmission x-ray imaging, which creates images by detecting the x-rays penetrating through an object, backscatter imaging uses reflected or scattered x-rays to create the image. More recently, handheld x-ray backscatter imaging devices have been introduced into the market.

SUMMARY

In typical backscatter imaging systems, a standard x-ray tube generates source x-rays, which are collimated into a fan beam by a slit in an attenuating plate. The fan beam is "chopped" into a pencil beam by a rotating "chopper wheel" that has slits, and the pencil beam is scanned over a target object being imaged as the chopper wheel rotates. The intensity of the x-rays scattered in the backwards direction is then detected as a function of the position of the source x-ray beam. By moving the target object through the plane containing the scanning beam, either on a conveyor or under its own power, a two-dimensional backscatter image of the object can be obtained. Alternately, the target object can be stationary, and the backscatter imaging system can be moved relative to the object The more recent handheld x-ray backscatter imaging devices can enable an operator to quickly and conveniently inspect suspect vehicles, packages, or other target objects. These devices have been designed to be relatively compact and lightweight, allowing them to be easily operated for extended periods of time. The backscatter detectors of these handheld devices are designed to be quite small and compact, allowing the front of the instrument to be maneuvered into tight or confined spaces, such as between the dashboard and windshield of a car or into the corners of a car trunk. The intensity of the x-rays backscattered from a target object decreases inversely with the square of the distance between the scattering target object and the backscatter detectors. For this reason, and because the backscatter detectors in these handheld devices are small and the x-ray source in a handheld instrument is limited to only 5-10 Watts (due to weight and size constraints), the maximum standoff distance between the instrument and the target is limited, typically to a distance of no more than about 12 inches.

In order to image target objects further away from the instrument than 12 inches, it would be advantageous to have more active detector area. If larger backscatter detectors, with larger active area, were used on an instrument, then more of the backscattered x-rays could be detected, therefore producing higher-quality images. However, larger detectors would limit the instrument's use for up-close imaging applications in confined spaces. In addition, larger detectors would be bulkier and heavier than the detectors on existing handheld x-ray scanning instruments and would make the instruments more difficult to use comfortably for extended periods of time.

Embodiments disclosed in this application relate to a removable large-area backscatter detector that can be easily attached and detached from a handheld backscatter imaging instrument. This allows the same instrument to be used in two imaging modes, with rapid interchangeability between the two modes:
  a) Instrument used with built-in, compact backscatter detectors only. This mode allows images to be acquired in confined spaces and at close standoff distances.
  b) Instrument used with additional larger-area detector accessory, allowing for improved image acquisition in non-confined spaces at larger standoff distances.

In one embodiment, an x-ray imaging system includes a movable x-ray imager. The movable x-ray imager includes a first backscatter x-ray detector assembly. The system further includes a second backscatter x-ray detector assembly that is removably attachable with the movable x-ray imager. The movable x-ray imager and the second backscatter x-ray detector assembly include complementary attachment features configured to secure, removably, the second backscatter x-ray detector assembly with the movable x-ray imager in an arrangement having the second and first backscatter x-ray detector assemblies fixedly oriented with respect to each other.

In another embodiment, an x-ray imaging kit includes a movable x-ray imager. The movable x-ray imager includes a first backscatter x-ray detector assembly. The system further includes a second backscatter x-ray detector assembly that is removably attachable with the movable x-ray imager. The movable x-ray imager and the second backscatter x-ray detector assembly include complementary attachment features configured to secure, removably, the second backscatter x-ray detector assembly with the movable x-ray imager in an arrangement having the second and first backscatter x-ray detector assemblies fixedly oriented with respect to each other.

In yet another embodiment, an x-ray imaging system includes means for x-ray imaging by detecting a first portion of backscattered x-rays that are backscattered from a target, the means for x-ray imaging being movable. The system further includes means for detecting a second portion of the backscattered x-rays, as well as means for securing, removably, the means for detecting the second portion of the backscattered x-rays with the means for x-ray imaging. The means for x-ray imaging is operable for x-ray imaging both (i) with the means for detecting the second portion secured to the means for x-ray imaging and (ii) with the means for detecting the second portion detached from the means for x-ray imaging.

In still a further embodiment, an x-ray imaging system includes a movable x-ray scanning module including an x-ray source configured to output source x-rays, a scanner configured to scan the source x-rays over a target, and an attachment feature. The system further includes a first backscatter x-ray detector assembly and a second backscatter x-ray detector assembly. Each of the first and second backscatter x-ray detector assemblies include respective complementary attachment features configured to secure, removably, the respective detector assemblies with the movable x-ray scanning module in an interchangeable manner.

In another embodiment, a method of x-ray imaging comprising includes scanning source x-rays over a target, using a movable x-ray scanning module with a first backscatter x-ray detector assembly removably attached with the movable x-ray scanning module. The method also includes removing, interchangeably, the first backscatter x-ray detector assembly from the movable x-ray scanning module. The method further includes attaching, removably and interchangeably, a second backscatter x-ray detector assembly with the movable x-ray scanning module. The method also includes scanning source x-rays over the target or another target using the movable x-ray scanning module with the second backscatter x-ray detector assembly removably attached with the movable x-ray scanning module.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 8D is a block diagram illustrating an embodiment x-ray imaging system operating in attached mode, without the processing functions of the embodiments of FIGS. 8A-8C.

FIG. 11 is a block diagram illustrating a general embodiment system (and kit) for x-ray imaging.

FIG. 17 is a side-view illustration of an embodiment x-ray imaging system having snap disc connectors for complementary attachment features that make a movable x-ray imager removably attachable with a second backscatter x-ray detector.

FIG. 18 is a side-view illustration of an embodiment x-ray imaging system for which bolts and threaded bolt holes are complementary attachment features that that are used to removably attach a movable x-ray imager and a second backscatter x-ray detector with each other via attachment of the imager and second detector to separate brackets.

FIG. 19 is a cross-sectional, end-view illustration of embodiment x-ray imaging system including a movable x-ray imager that fits into an inner opening formed by a partial outer loop of a second backscatter x-ray detector.

FIGS. 20A, 20B, and 20C illustrate various aspects of an embodiment x-ray imaging system including an x-ray scanning module and two detector assemblies of different sizes (different active detector areas), with FIG. 20A showing the first detector removably attached to the scanning module, FIG. 20B showing the second detector assembly removably attached to the scanning module instead of the first detector assembly, selectively, and FIG. 20C showing the scanning module and two detector assemblies as a full system or kit.

DETAILED DESCRIPTION

A description of example embodiments follows.

Figure 1:
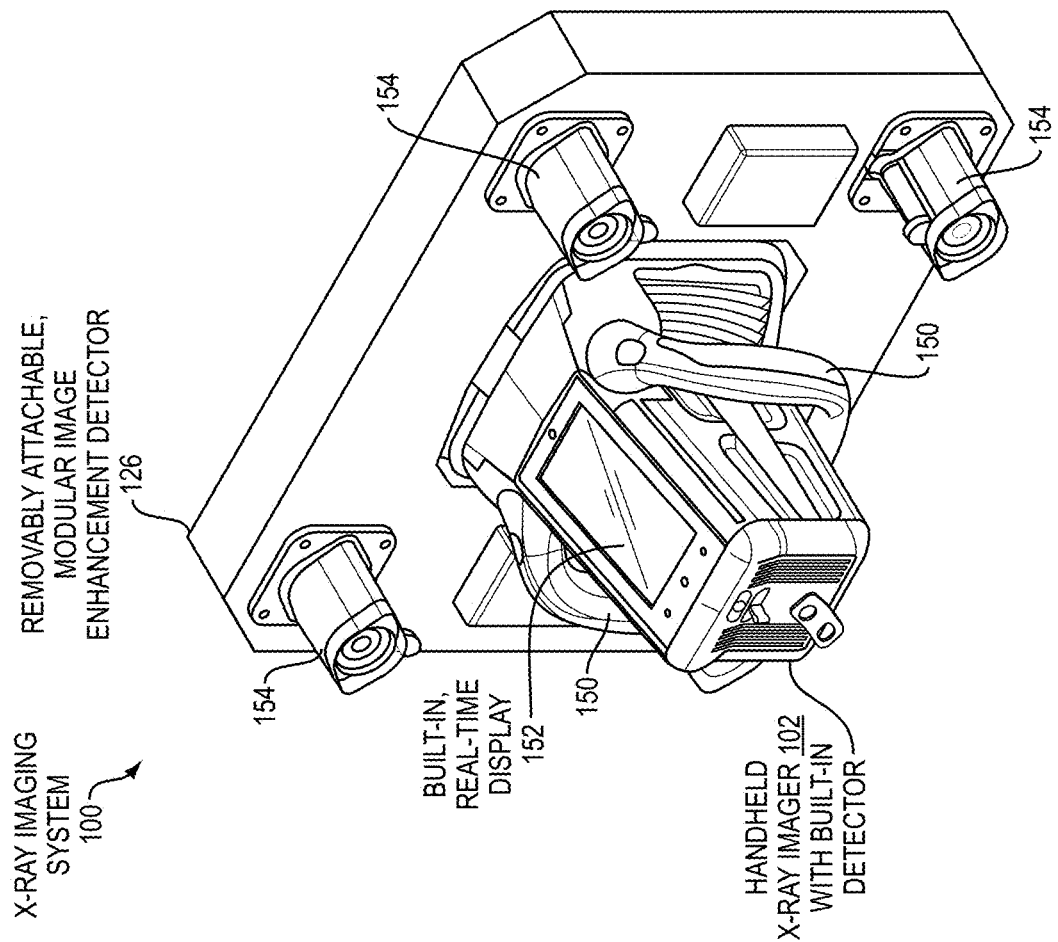
FIG. 1 is a perspective-view illustration of an embodiment x-ray imaging system including a movable, handheld x-ray imager and a second detector that is removably attachable to the imager.

FIG. 1 is a perspective-view illustration of an embodiment x-ray imaging system 100. The system 100 includes a movable x-ray imager 102, which includes a built-in, real-time image display 152. The movable x-ray imager 102 also includes a built-in backscatter x-ray detector assembly, which is also referred to herein as a "first detector assembly" or "first detector," which is not illustrated separate from the imager 102 in FIG. 1, but which is more particularly pointed out in FIGS. 1 and 2. The system further includes a removably attachable, modular, image enhancement detector 126, which is also referred to herein as a "second detector assembly" or "second detector." As used herein, it should be understood that first and second detector assemblies may include multiple components, such as scintillator sheets, photomultiplier tubes, wires, housings, etc. Furthermore, some detector assemblies described herein include multiple detector panels, as described further in connection with FIG. 6.

In the embodiment of FIG. 1, the x-ray imager 102 is movable by virtue of being handheld by a human operator using two handles 150. The x-ray imager 102 is independently operable, without the second detector being attached, for scanning close up to target objects or in cramped spaces. The second detector 126 is quickly attachable to the handheld x-ray scanner for enhanced imaging, as will be further described hereinafter. The second detector 126, being quickly attachable and detachable, provides enhanced flexibility and imaging capabilities for the system 100 beyond those that would be present with the movable, handheld x-ray imager 102 alone. Further, the x-ray imager 102 is operable on battery power in both attached and detached modes, facilitating flexible movement and rotation of the imager 102 based on scanning environment and needs.

The x-ray imager 102 includes an x-ray source that is configured to output source x-rays, as well as a scanner configured to scan the source of x-rays over a target object that is to be imaged. The imager 102 further includes a backscatter x-ray detector configured to detect a first portion of backscattered x-rays that are backscattered from the target and to output a first signal representative of the first portion of backscattered x-rays. While these features are not illustrated or visible in FIG. 1, these features are illustrated in other drawings and are further described hereinafter.

Figure 6:
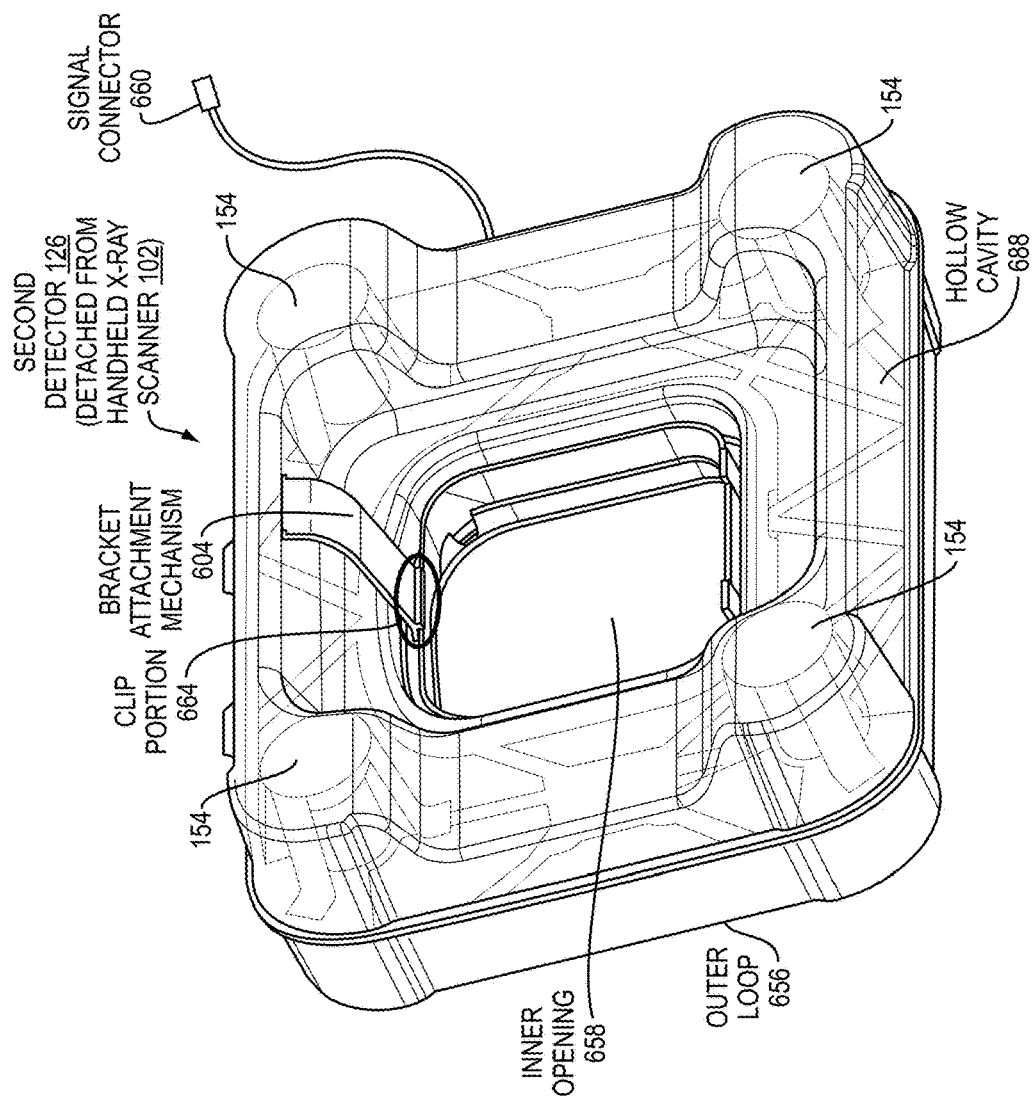
FIG. 6 is a perspective illustration of the second detector shown in FIGS. 1 and 5 in greater detail.
Figure 10:
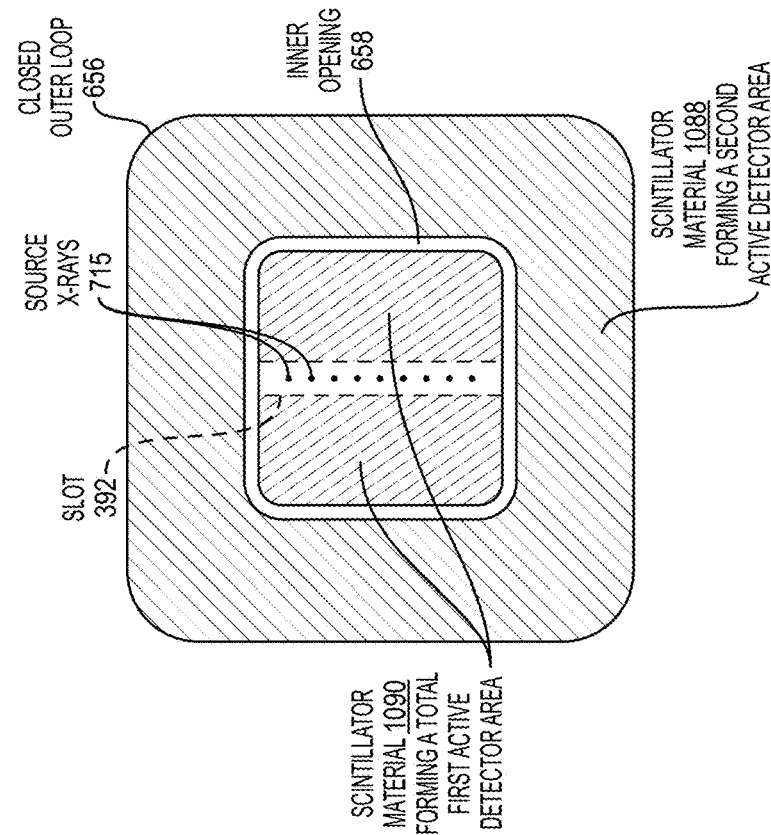
FIG. 10 is a cross-sectional illustration of the interiors of the first and second detectors of FIGS. 1-6, when attached to each other.

The second backscatter x-ray detector 126 is removably attachable with the movable x-ray imager 102, as illustrated further in connection with FIG. 6. The second backscatter x-ray detector 126 is further configured to detect a second portion of the backscattered x-rays from the target and to produce a second signal representative of the second portion of backscattered x-rays. This second signal is produced, in various aspects, using a scintillator material that is illustrated in FIG. 10, together with the photomultiplier tubes (PMTs) 154.

The x-ray imager 102 includes two handles 150 for being gripped by human hands for movement. The imager 102 further includes a built-in imaging display 152 that is capable of displaying real-time images of the target object. Other embodiments may produce static images or periodically updated images of the target object.

In further detail, the movable x-ray imager 102 is configured to output a representation of images of the target according to the following alternative configurations. In the detached mode of operation, with the second detector 126 detached from the x-ray imager, the representation of the images of the target is a function of the first signal that is produced by the imager 102 alone. In the embodiment system 100, the representation is image data provided to the built-in display 152. As used herein, "image data" means a signal that can be input to a display to render an image.

Alternatively, in the attached mode of operation, with the second detector 126 attached to the imager 102, the representation of the images of the target can be a function of the first signal from the imager 102 alone, a function of the second signal from the detector 126 alone, or, further advantageously, a function of the first and second signals. This second mode of operation, with additional details, is described further in connection with FIGS. 7 and 8A-8D, for example.

Figure 2:
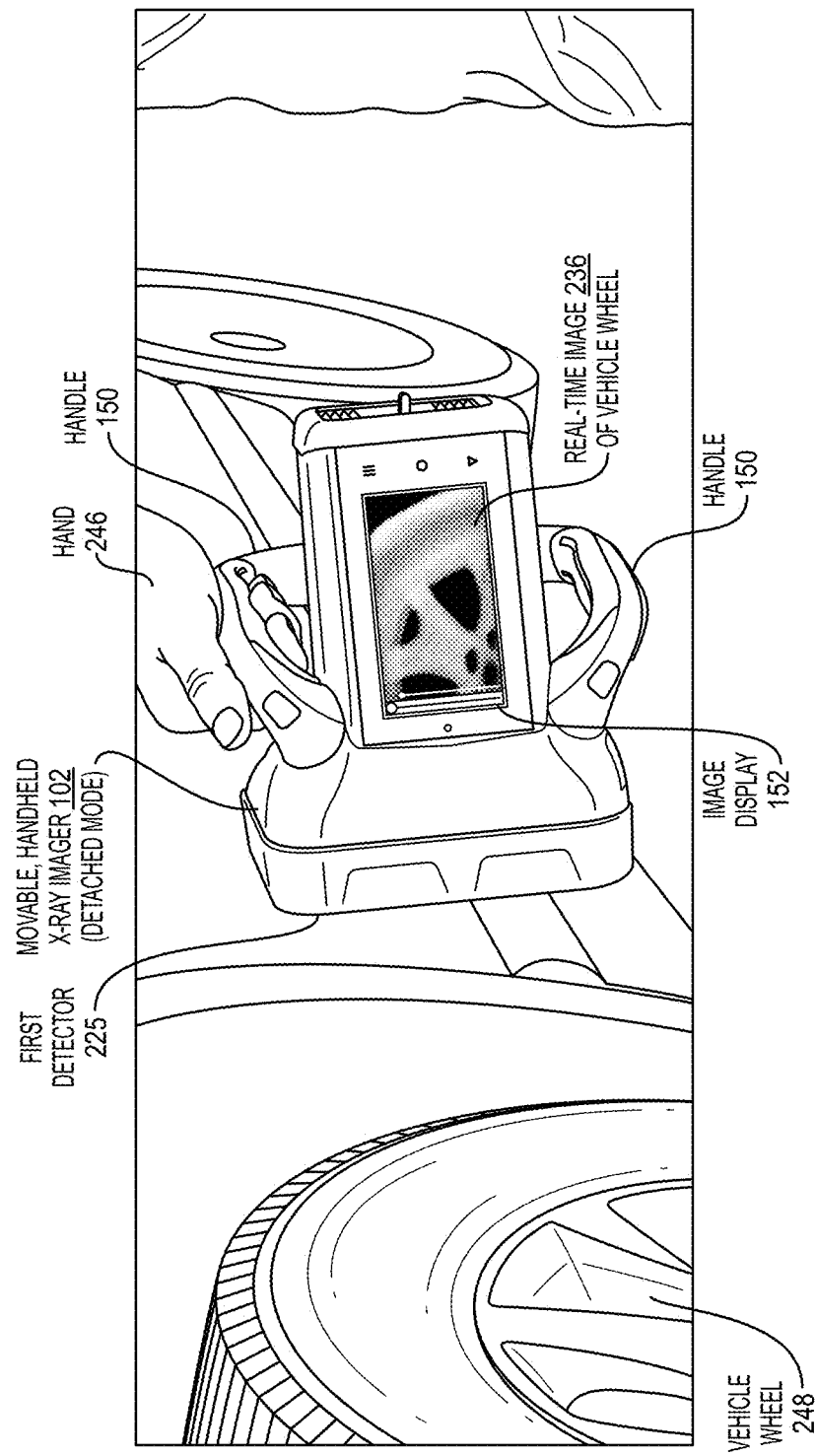
FIG. 2 is an illustration of the handheld x-ray imager of FIG. 1 being used in detached mode, with the second detector detached therefrom.

FIG. 2 is an illustration of the movable, handheld x-ray imager 102 of FIG. 1 being used in detached mode, with the second detector detached therefrom. In particular, the imager 102 is being used to acquire x-ray images of a vehicle wheel 248. The image display 152 shows an acquired x-ray image 236 of the vehicle wheel the image 236 is updated in real time as a hand 246 of a person moves the imager 102 around the wheel of the car. Accordingly, in this mode, representations of the one or more images of the vehicle wheel targets 248 are outputs, within the imager 102, to the display 152, as image data that can be rendered at the display 152. The representation of these images is, thus, a function only of the first signal that is output from a first detector 225 of the imager 102.

As used herein, "movable" means translatable and rotatable. In the embodiments of FIGS. 1-2, the x-ray imager 102 is movable by means of being held by a person's hand. In this manner, the imager 102 is freely translatable (here, in three dimensions), as well as rotatable about three mutually perpendicular rotation axes. These mutually perpendicular rotation axes are not illustrated in FIG. 2, but because the imager 102 is freely rotatable, in this embodiment, the perpendicular rotation axes are arbitrary. In other embodiments, in which movability is provided by a robotic arm or other means, an x-ray imager may be translatable in fewer than three dimensions, such as in one or two dimensions. Nonetheless, translation in three dimensions and rotation about any arbitrary rotation axes is preferable to increase the number of environments and applications to which embodiments may be applied.

Figure 4:
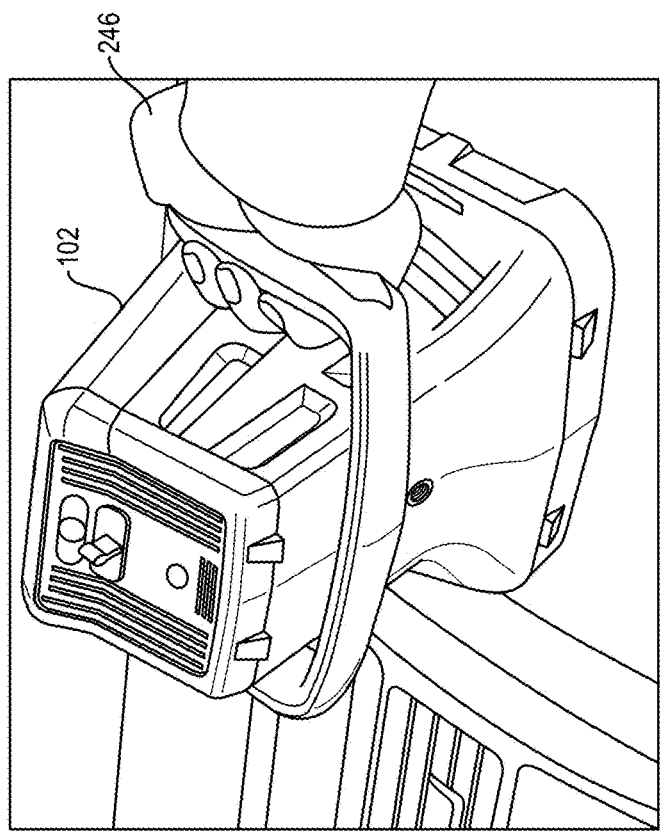
FIG. 4 is a perspective view of the imager of FIGS. 1-3, held by a hand, in detached mode, being used to scan a cramped area within a vehicle interior.
Figure 5:
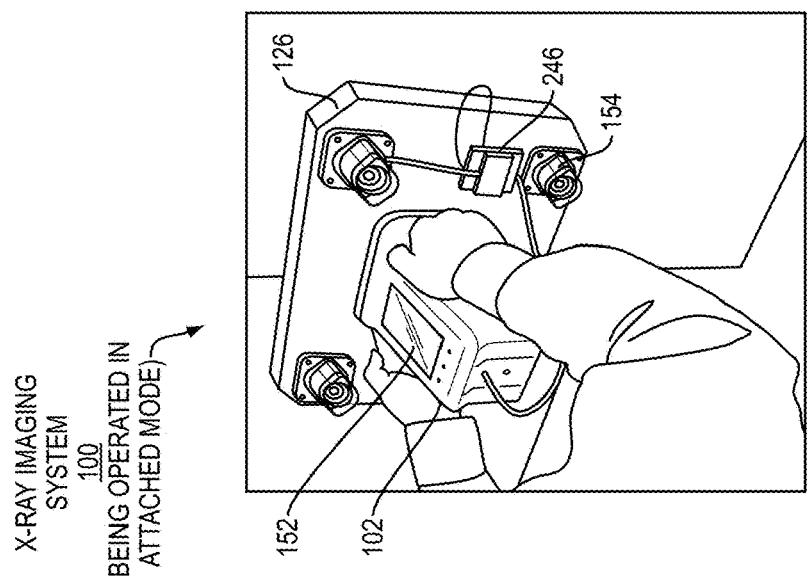
FIG. 5 is a perspective view of the x-ray imaging system of FIGS. 1-4, being operated in attached mode, with the second detector attached to the x-ray imager

Continuing to refer to FIG. 2, the movability of the imager 102 in any arbitrary linear translation directions and about any arbitrary rotational axis provides flexibility for the imager 102 to be moved and pointed in many different directions around a target, such as the vehicle wheel 248, a vehicle dashboard interior area of a car as illustrated in FIG. 4, and many other environments, as illustrated in FIG. 5, for example. However, in other embodiments, the movability of the x-ray imager 102 and system 100 may be provided by means of a robotic arm to which the system 100 may be attached, as described in connection with FIG. 9, for example.

Figure 3:
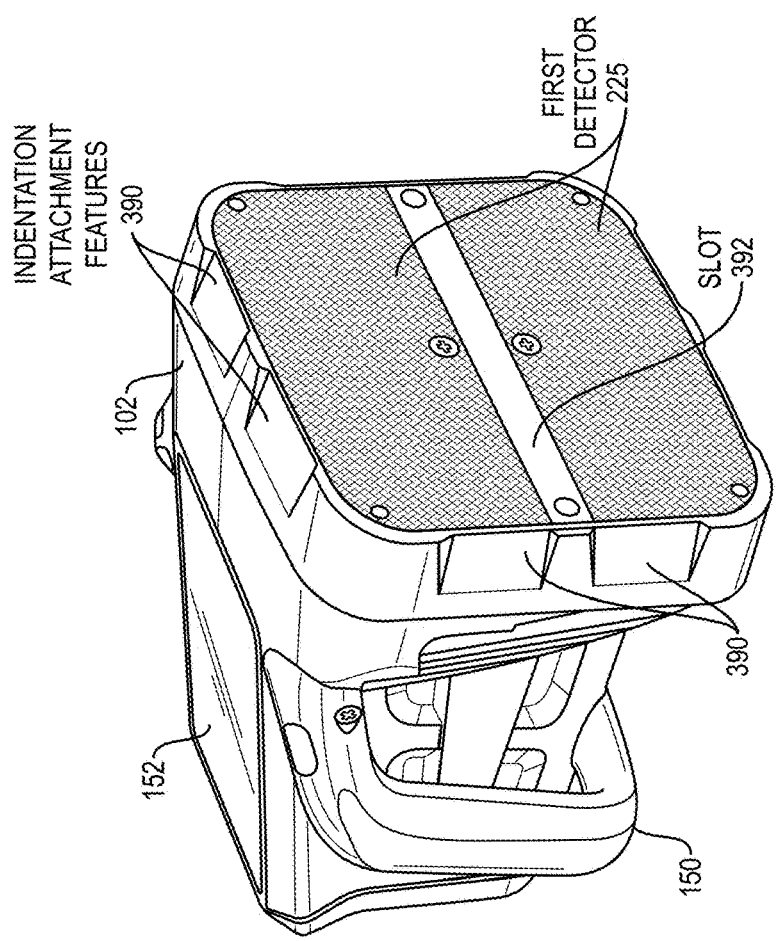
FIG. 3 is a perspective view of the front area of the x-ray imager illustrated in FIGS. 1-2.

FIG. 3 is a person perspective view of the front area of the x-ray imager 102 illustrated in FIGS. 1-2. The front area of the imager 102 includes a first detector 225, which is the only detector that is operable in detached mode with the second detector 126 detached therefrom, as illustrated in FIG. 3. The first detector 225 comprises two active area sections, as illustrated in FIG. 3, divided by a slot 392 through which source x-rays are directed from an x-ray source and scanner inside the imager 102 to outside the imager 102 to be scanned over a target. These features are described in more detail hereinafter in connection with FIGS. 7 and 10, for example.

FIG. 3 also shows indentation attachment features 390, which are indentations in the cover of the first detector 225. These indentations are complementary to attachment features of the second detector 126, which are illustrated in FIG. 6.

FIG. 4 is a perspective view of the imager 102, held by the hand 246, in detached mode, being used to scan a cramped area within a vehicle interior, namely between the dash and windshield of the car.

FIG. 5 is a perspective view of the x-ray imaging system 100 of FIGS. 1-4 being operated in attached mode, with the second detector 126 attached thereto and being held by the handles 150 by a person. In particular, the system 100 is being used to scan the contents of a file cabinet from outside the cabinet. In this scanning environment, there is no cramped space, as in the interior of the vehicle of FIG. 4, so use of the imaging system 100 in attached mode provides various advantages. In particular, the representations of the x-ray images that are provided to the image display 152 are a function of both the first signal (output from the first detector 225) and of the second signal (output from the second detector 126).

FIG. 6 is a perspective illustration of the second detector assembly 126 shown in FIGS. 1 and 5 in greater detail. Visible in the illustration of FIG. 6 is that the second detector assembly 126 forms a closed outer loop 656 that defines an inner opening 658. In order for the second detector 126 to be removably attached and detached from the handheld x-ray imager 102, the second detector 126 is provided with a bracket attachment mechanism 604 that has a clip portion 664 on the end thereof.

The bracket attachment mechanism 604, with clip portion 664, is an attachment feature of the second detector 126 that is complementary to the indentation attachment features 390 of the imager 102 that are illustrated in FIG. 3. In this embodiment, the features 390 and features 604 and 664 are complementary in the following manner. The bracket attachment mechanism (attachment feature) 604 has spring action in order to allow the imager 102 to be inserted, with slight force, into the inner opening 658 of the second detector 126. The clip portion 664, working together with the spring action of the bracket attachment mechanism 604, thus retains the x-ray imager 102 attached with the second detector 126 and within the inner opening 658. Accordingly, these features are complementary, working together in order to fix the orientation of the first and second detectors with respect to each other when the second detector 126 is attached to the x-ray imager 102 for scanning.

As used herein, first and second detector assemblies are "fixedly oriented with respect to each other" when the second detector assembly is secured to the movable x-ray imager such that, in the attached mode of operation, the first and second detector assemblies move substantially synchronously with each other and with the movable x-ray imager when the movable x-ray imager is moved. With fixed orientation with respect to each other, both the first and second detector assemblies can remain configured to remain sensitive to, or to detect, substantial radiation from a target when the target is irradiated by the same x-ray source beam, so long as both the first and second backscatter x-ray assemblies remain active.

In some embodiments, first and second detectors may be fixedly oriented with their active detection areas facing a common direction, such as when the respective active detection areas are substantially coplanar, as illustrated in FIG. 10. However, in other embodiments, first and second detectors are fixedly oriented with respect to each other such that their respective active detection areas are not substantially coplanar. Even in non-coplanar embodiments, first and second detector assemblies may be fixedly and removably oriented with respect to each other, in the attached mode of operation, to receive backscattered x-rays from a common target when the target is x-ray scanned.

In other embodiments, attachment mechanisms form part of the movable x-ray imager or of both the movable x-ray imager and the second detector. In various embodiments, the attachment mechanism may include a mechanical latch, snap, or pin fastener enabling the second backscatter x-ray detector 126 to be removably attachable to the x-ray imager 102. In yet further embodiments, the attachment mechanism may be magnetic. For example, the second detector 126 and x-ray imager 102 each may be outfitted with magnets configured to have opposite poles facing each other in the attached configuration, such that the second detector is removably attached to the x-ray imager.

The outer loop 656 further forms an interior hollow cavity 688, which is lined with a scintillator material to form an active detector area within the second detector 126, as further illustrated in FIG. 10, for example. The scintillator material is configured to produce light when the second portion of the backscattered x-rays, captured by the second detector 126, impinges thereon. Photodetectors (in the second detector 126, the PMTs 154) receive the light produced by the scintillator material and convert the light into an electrical signal, which is the second signal representative of the second portion of the backscattered x-rays received at the second detector 126, as described hereinabove.

The second detector 126 includes a signal connector 660, through which the electrical signal (second signal) is output from the second detector 126 to the x-ray imager 102 when the system 100 is used and operated in attached mode. Accordingly, the x-ray imager 102 can then output the representation of one or more images of the target as a function of either the first signal alone, of the second signal alone, or as a function of the first and second signals, such as when the signals are combined electrically or in software, or such as where the first and second signals are processed by the x-ray imager 102 in order to form respective representation parts to form respective x-ray images.

In the embodiment illustrated in FIGS. 1-6 and 10, when the system 100 is used and operated in the detached mode of operation, only the first detector (the built-in, two-section backscatter detector 225), illustrated in FIG. 3, is used to detect backscatter x-rays from a target. The detached mode of operation provides high-quality backscatter imaging at closer distances from the first detector and a target, such as between about 0 and 12 inches, and in confined spaces. The attached mode of operation, in contrast, allows images to be acquired at larger standoff distances between the first detector and a target, such as in a range of approximately 12-60 inches, for example.

The handheld backscatter imaging system 100 is illustrated in FIG. 1 with a large-area, second backscatter x-ray detector accessory attached. The large area detector accessory can provide anywhere from about 2 times the detection area of the built-in compact detectors in the instrument, up to 10 or even 15 times the detection area, depending on the imaging sensitivity required. The instrument with the detector accessory attached is ideal for scanning objects with thicker enclosure walls (e.g. shipping containers with 3 mm steel sides), or for scanning anything at larger standoff distances, allowing for more rapid inspection of larger objects (e.g. trucks or cargo containers).

The second, larger-area detector accessory assembly illustrated in FIG. 6 is preferably easy to install on the front of the backscatter x-ray imaging instrument and is preferably also very easy to detach, such that the mode of operation can be changed rapidly. The bracket attachment mechanism 604 is designed to mechanically snap onto the front of the imager 102 with a latching mechanism. By applying pressure to the latch, the detector assembly can be easily removed from the instrument after the imaging has been performed. The interior cavity of the detector assembly is lined with scintillator screen, with the optical readout of the scintillator achieved with one or more photodetectors, the PMTs 154 in FIGS. 1 and 6. As an example, the scintillator screen can consist of BaFCl screen, read out with four 1.5" diameter PMTs, positioned at the four corners of the assembly. Typical thicknesses of scintillator screen for a 120 kV instrument range from 80 mg/cm$^2$ BaFCl on the front-facing interior surface of the detector assembly cavity, to 250 mg/cm² BaFCl on the sides and rear interior surfaces.

Alternatively, the light collection of the scintillation light from the scintillator screen in the detector assembly can be done using wavelength shifting fibers (WSF) and the fibers can be bundled and attached to the front face of one or more PMTs, either directly or by means of a prism. The WSF light collection scheme can allow for a more compact large area detector assembly, which can potentially be lighter and easier to use over extended periods.

The handheld backscatter imager 102 includes two compact, built-in backscatter detectors, each with dimensions of approximately 6.5 cm×15 cm. The large area second detector assembly shown in FIG. 6, which attaches to the handheld imager 102, has external dimensions of approximately 30 cm×46 cm, with the central hole (inner opening) designed so that the front end of the imaging instrument fits snuggly into the hole.

The analog signals from the PMTs are summed together and then sent to the imaging instrument via a coaxial cable and connector. Alternatively, the signals can be digitized via circuitry installed within the detector accessory, and the digitized signals can then be wirelessly transmitted to the imaging instrument, or wirelessly sent to some other remote display device, such as a tablet or a laptop computer.

The output signals from the large area detector assembly can be combined electrically or in software with the output signals from the central, built in detectors in the instrument before being displayed. Alternatively, the signals can be processed and/or displayed separately. This can be helpful, for example, when looking at objects positioned at a larger distance behind a thick, highly-scattering barrier. Scatter from the concealing barrier will preferentially be detected in the central detector, because the active area of that detector is closer to the scatter point where the primary beam is incident on the barrier. The large area, outer detector will be less sensitive to scatter from the barrier as its active area is further away from the scatter point on the barrier, and therefore the signal to noise ratio of the concealed object in the backscatter image can be significantly improved.

Figure 7:
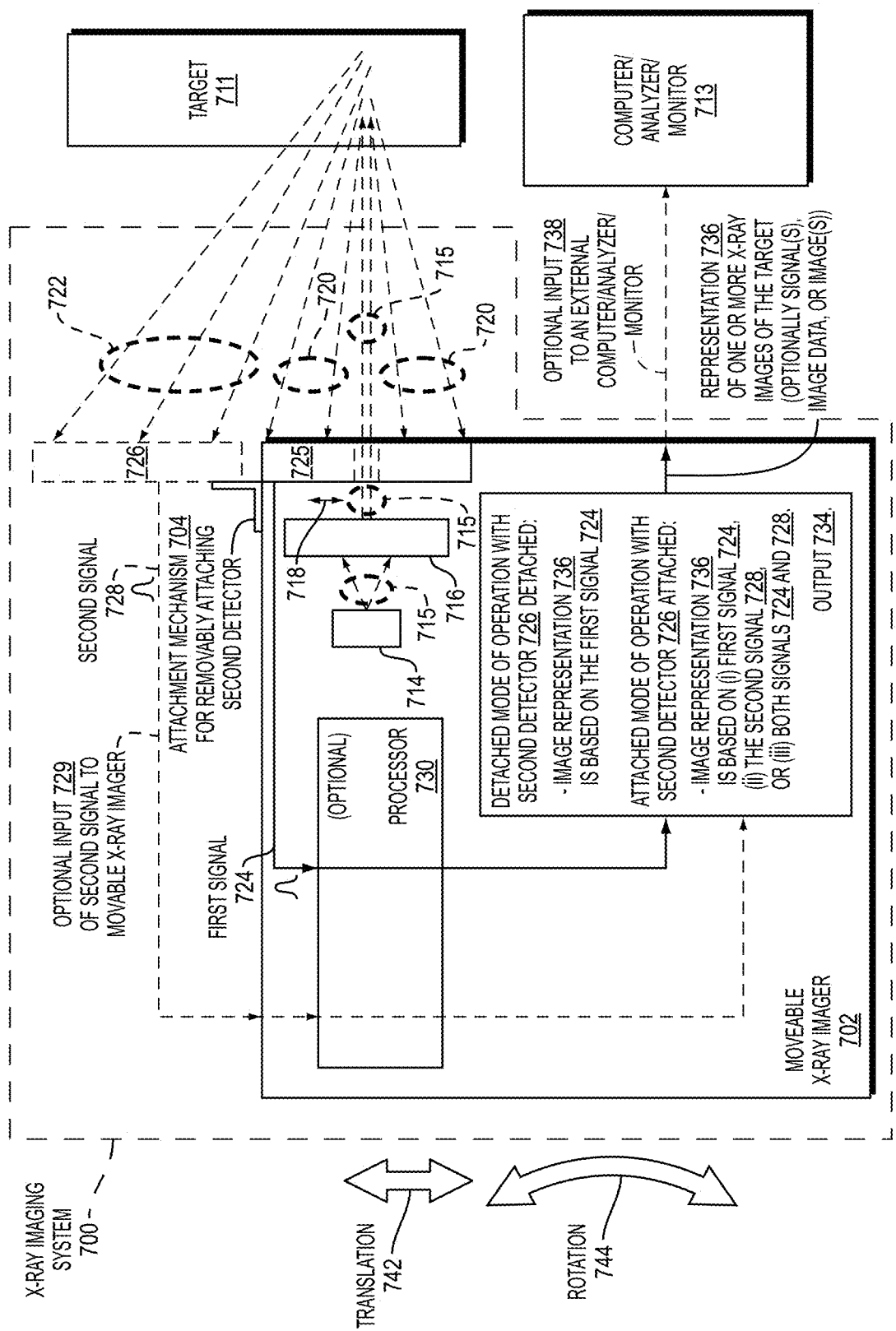
FIG. 7 is a block diagram illustrating a more general embodiment x-ray imaging system and general modes of operation thereof, along with an environment of use thereof, including a target and an external computer/analyzer/monitor.

FIG. 7 is a block diagram illustrating a generalized embodiment x-ray imaging system 700, and the environment of use thereof, including a target 711 and an external computer/analyzer/monitor 713, and general modes of operation of the system.

Figure 9:
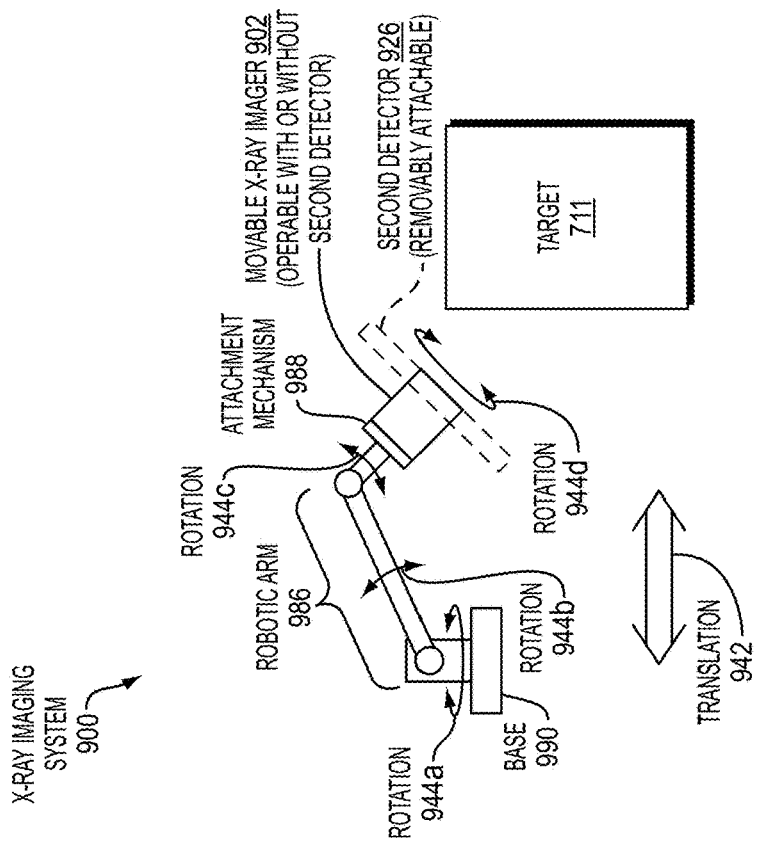
FIG. 9 illustrates an embodiment x-ray imaging system that includes a robotic arm configured for mounting an x-ray imager thereto to make the x-ray imager movable without being manually handled by a human.

The x-ray imaging system 700 includes a movable x-ray imager 702. Movement via translation 742 and rotation 744 may be provided by various means. While schematic illustration of the translation motion 742 is one-dimensional, actual translation motion of embodiment movable x-ray imagers may generally be one-dimensional, two-dimensional, or three-dimensional, as can be provided by the handheld x-ray imager of FIGS. 1-6, or as may be provided by a robotic arm, as described further hereinafter in relation to FIG. 9. The rotation 744 in FIG. 7 is illustrated schematically as being about a single rotational axis (not shown). However, it should be understood that the rotation 744, more generally, is rotation about one, two, or three mutually perpendicular rotation axes, and the rotation 744 can also be about any arbitrary axis or axes. This rotation, like the translation, may be provided by hand operation, as illustrated in FIGS. 2, 4, and 5, for example. Nonetheless, one, two, or three axes of rotation, or more, may be provided by a robotic arm, as illustrated in FIG. 9. "Movable", as used herein, indicates that an x-ray imager is both translatable in one, two, or three dimensions, and also rotatable about one, two, or three rotational axes, during operation in both attached and detached modes of operation. Accordingly, while an x-ray imager is operated, scanning an x-ray beam and creating image representations, the x-ray imager is fully movable in various embodiments. Furthermore, in attached mode, with a second detector attached with the movable x-ray imager, the system 700 is further translatable and rotatable during operation, while x-rays are scanning the target 711, and while the system is outputting representations of x-ray images of the target.

Figure 12:
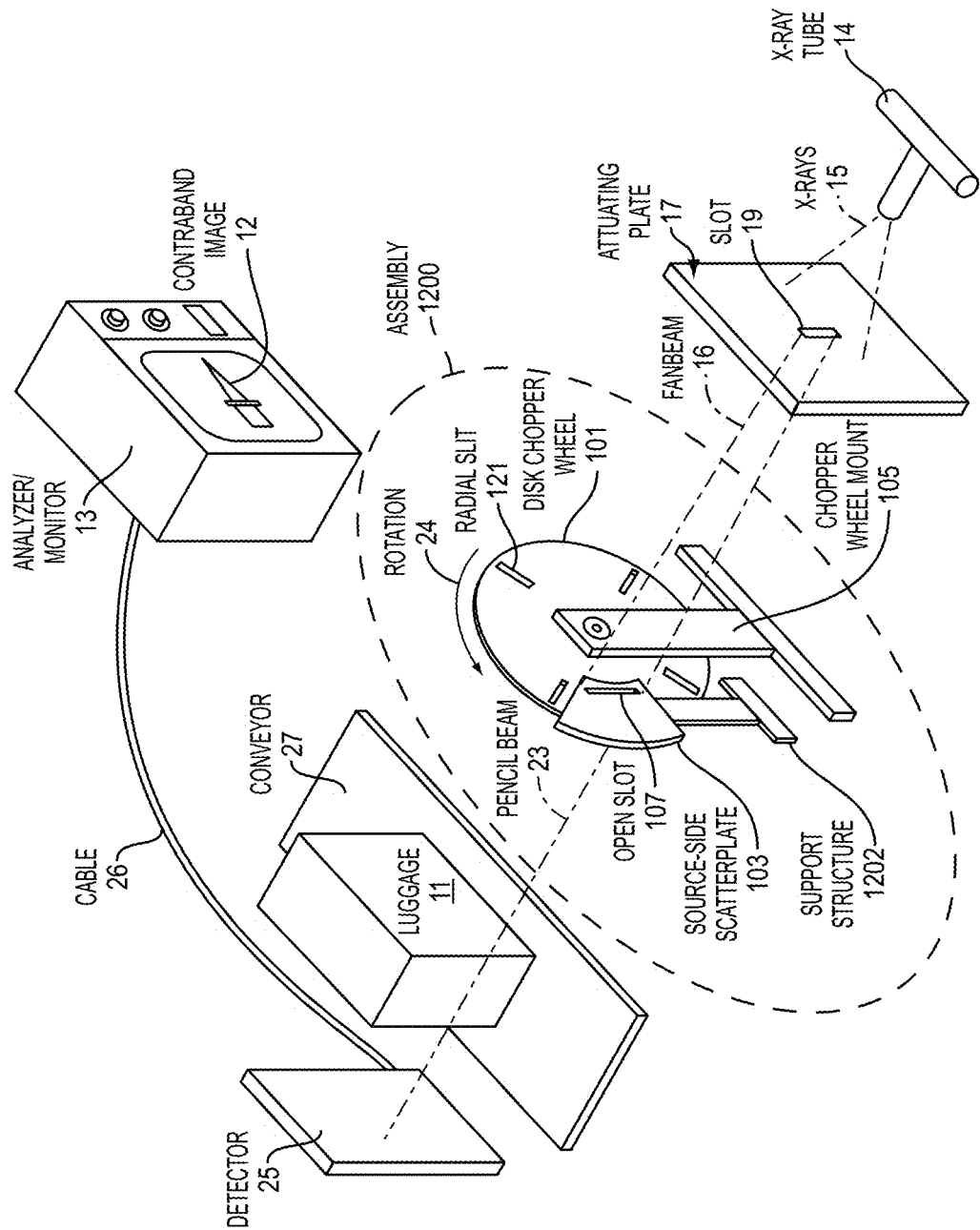
FIG. 12 is an illustration of a fixed-mount x-ray scanning system incorporating an open-geometry chopper wheel assembly as a scanner.

The x-ray imager 702 includes an x-ray source 714 that is configured to output source x-rays 715 therefrom. The x-ray source 714 may include an x-ray tube, for example, as is illustrated in FIG. 12, and as is known in the art of x-ray imaging. The x-ray imager 702 further includes a scanner 716 that is configured to scan the source of x-rays 715 over the target 711. The scanner 716 may include a disk chopper wheel with various radial slits therein, as is known in the art, and as illustrated in FIG. 12. The scanner 716 may also include various optional components, such as a source-side scatter plate, as illustrated in FIG. 12, and output-side scatter plate, or other types of scanning wheels, such as hoops, drums, and other configurations. The scanner 716 may also include an angled chopper wheel assembly. A scanner may also include, for example, an attenuating plate with a slot therein that is configured to produce a fan beam at the disc chopper wheel or at an output therefrom, for example. Some of these features are further described in U.S. patent application Ser. No. 15/527,566, filed Nov. 20, 2015 and titled "X-Ray Scanning System," and in U.S. patent application Ser. No. 15/946,425, filed Apr. 5, 2018 and titled "X-Ray Chopper Wheel Assembly," both of which are hereby incorporated by reference in their entireties.

The x-ray imager 702 further includes a first backscatter x-ray detector 725, which is configured to detect a first portion 720 of backscattered x-rays that are backscattered from the target 711. The first detector 725 is also configured to output a first signal 724 that is representative of the first portion 720 of backscattered x-rays. Various types of backscatter x-ray detectors are known in the art and may be used in particular embodiments as the first backscatter x-ray detector 725. Scanning the x-rays over the target may include scanning a pencil x-ray beam over the target, as described in connection with FIG. 12, for example. The scanning over the target 711 imparted by the scanner 716 is illustrated at a bidirectional arrow 718, indicating that the source x-rays 715 will be incident at various locations on the target 711 during scanning.

The first backscatter x-ray detector 725 is configured to produce a first signal 724 that is representative of the first portion 720 of backscattered x-rays. The first signal 724 may be an analog electrical signal output from a photomultiplier tube PMT or other detector that forms part of the first detector 725. However, in other embodiments, the first signal 724 may be a digital signal, and the detector 725 may be configured to output a digitized signal representing the first portion 720 of backscattered x-rays. For example, the detector 725 may include an analog-to-digital A/D converter.

The x-ray imaging system 700 further includes a second backscatter x-ray detector 726 that is removably attachable with the movable x-ray imager 702. This removable attachment may be provided by various means, including the bracket attachment mechanism 604 illustrated in FIG. 6, a mechanical latch, snap, or pin fastener, a magnetic mechanism, or any other attachment means to secure, removably, this second detector 726 to the x-ray imager 724 operation of the imaging system 700 in either attached mode or detached mode, optionally and selectively.

The second detector 726 is configured to detect a second portion 722 of the backscattered x-rays that are backscattered from the target 711. The second detector 726, when attached with the movable x-ray imager 702, is configured to detect the second portion 722 of x-rays and to output a second signal 728 that is representative of the second portion of backscattered x-rays. As with the first signal 724, the second signal 728 may be an analog electrical signal produced by a PMT or other light detector working in connection with a scintillator material in the second detector 726, for example. However, in other embodiments, the second signal 728 may be digital.

It should be understood that the second signal 728 may be output from the second detector 726 via a wired connector, such as the signal connector 660 illustrated in FIG. 6, to the x-ray imager 702. Furthermore, the second signal 728 may be output to the x-ray imager 702 via a wireless communication module, such as that illustrated in FIG. 8D. The output of the second signal may be to the x-ray imager 702 via either wired or wireless means, but the output of the second signal 728 may also be to an external computer/analyzer/monitor 713, which is also illustrated in FIG. 7, as illustrated in FIG. 7.

In a detached mode of operation, with the second detector 726 detached from the movable x-ray imager 702, the first signal 724 may be processed, optionally, by an optional processor 730. Example processing functions that may be performed by the optional processor 730 are described further in connection with FIGS. 8A-8C, for example. These may include analog to digital (A/D) conversion, basic digital signal processing, graphic signal processing, etc. As an alternative, the first signal 724 may be directly output from the x-ray imager 702 as a representation of one or more images of the target 711, where the representation is a function of the first signal. This output of a representation 736 may be wired or wireless. The output of the representation 736 may be to an external computer/analyzer/monitor 713, as illustrated in FIG. 7. Alternatively, the output of the representation 736 may be, with appropriate processing, an image signal for input to an onboard image display, such as the display 152 illustrated in FIG. 2.

In an attached mode of operation, with the second detector 726 attached with the movable x-ray imager 702, the second signal 728 output from the second detector 726 may be optionally input to the imager 702, as illustrated at the optional input 729. Similar to the first signal 724, the second signal 728 may be optionally processed by the optional processor 730 or by another processor. The second signal 728 may, therefore, be available to the imager 702 for formation of an image the image representation 736 as a function of the second signal or of both first and second signals.

Where the second signal 728 is input into the imager 702, in the attached mode of operation, the image representation 736 may be at least one of (i) a function of the first signal alone, (ii) a function of the second signal alone, or (iii) a function of the first and second signals separately or combined. Where the representation is a function of the first signal alone, the second signal 728 may be ignored by the x-ray imager 702 in developing the image representation 736. Accordingly, in the attached mode of operation, the image representation 736 may still be, optionally, based only on the first signal 724. This may be useful for seeing alternative views of the target, as further described in connection with FIG. 8B. Alternatively, the representation 736 may be a function of the second signal alone. Again, this may be useful for an alternative, complementary view of the target 711, based on x-rays that are scattered from greater depths within the target, as described hereinafter in connection with FIG. 8B. Still further, advantageously, the representation 736 may be a function of both the second and the first signals. This may occur when the representation is a two-part representation of two or more images of the target, with a first part of the two-part representation being of a first image of the two or more images at a function of the first signal. The second part of the two-part representation is, then, of a complementary, second image of the two or more images, which is a function of the second signal. This two-part representation is described further in connection with FIG. 8B.

Figure 8A:
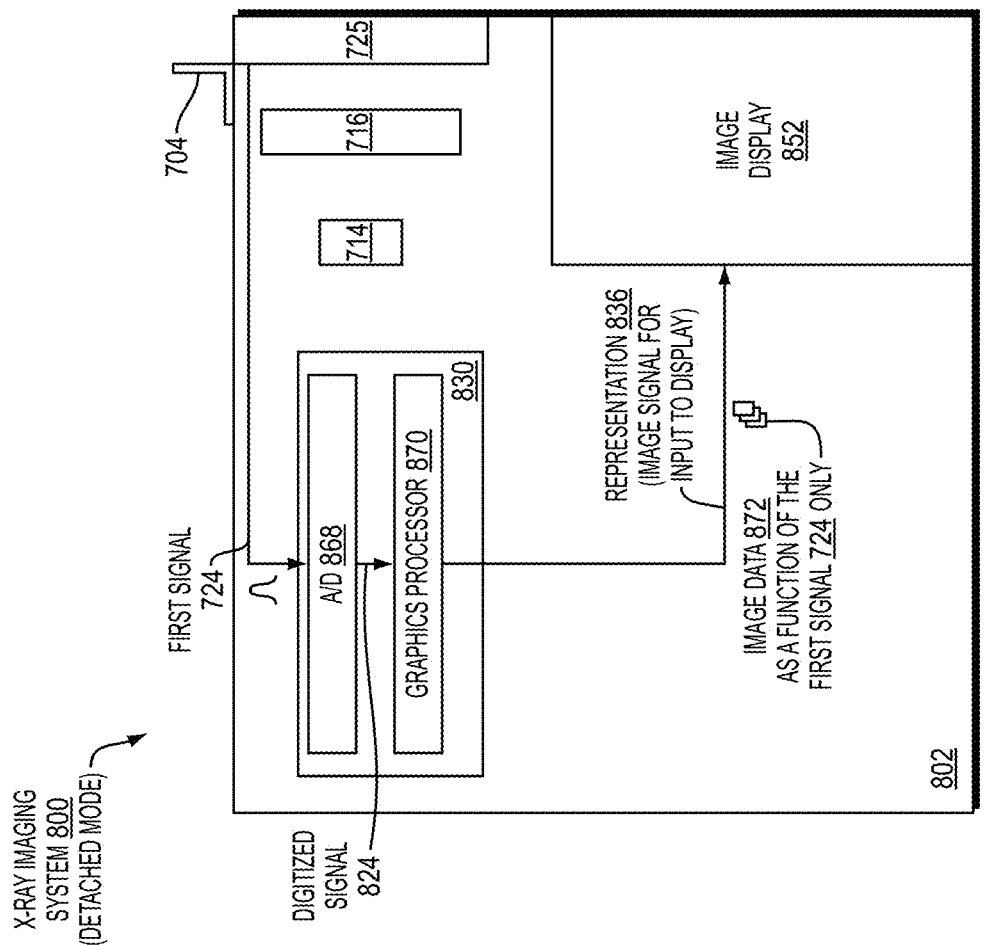
FIG. 8A is a block diagram illustrating an embodiment x-ray imaging system with a built-in display being operated in detached mode, with the second backscatter x-ray detector detached from a movable x-ray imager.
Figure 8B:
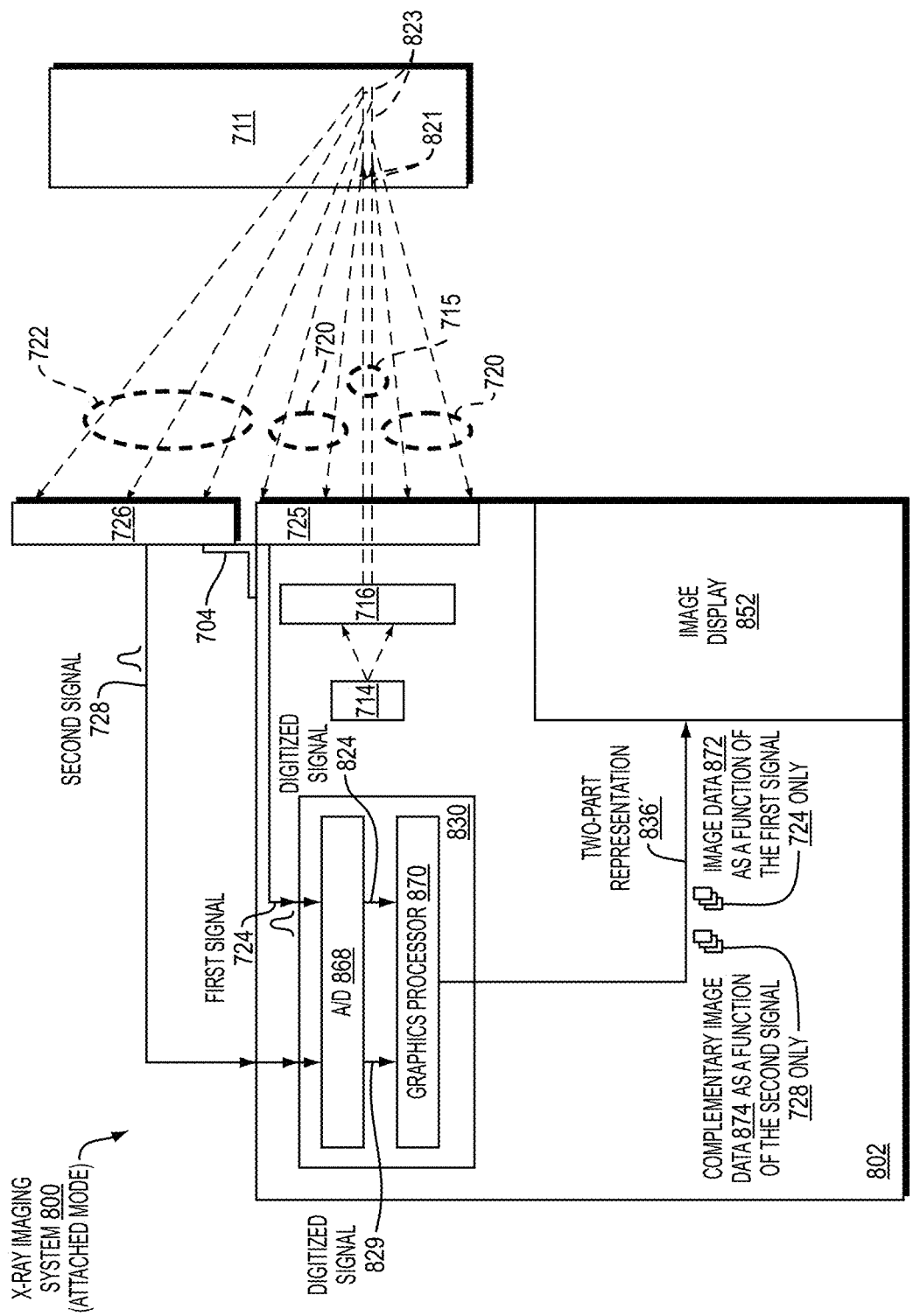
FIG. 8B is a block diagram that illustrates the system FIG. 8A operating in attached mode.
Figure 8C:
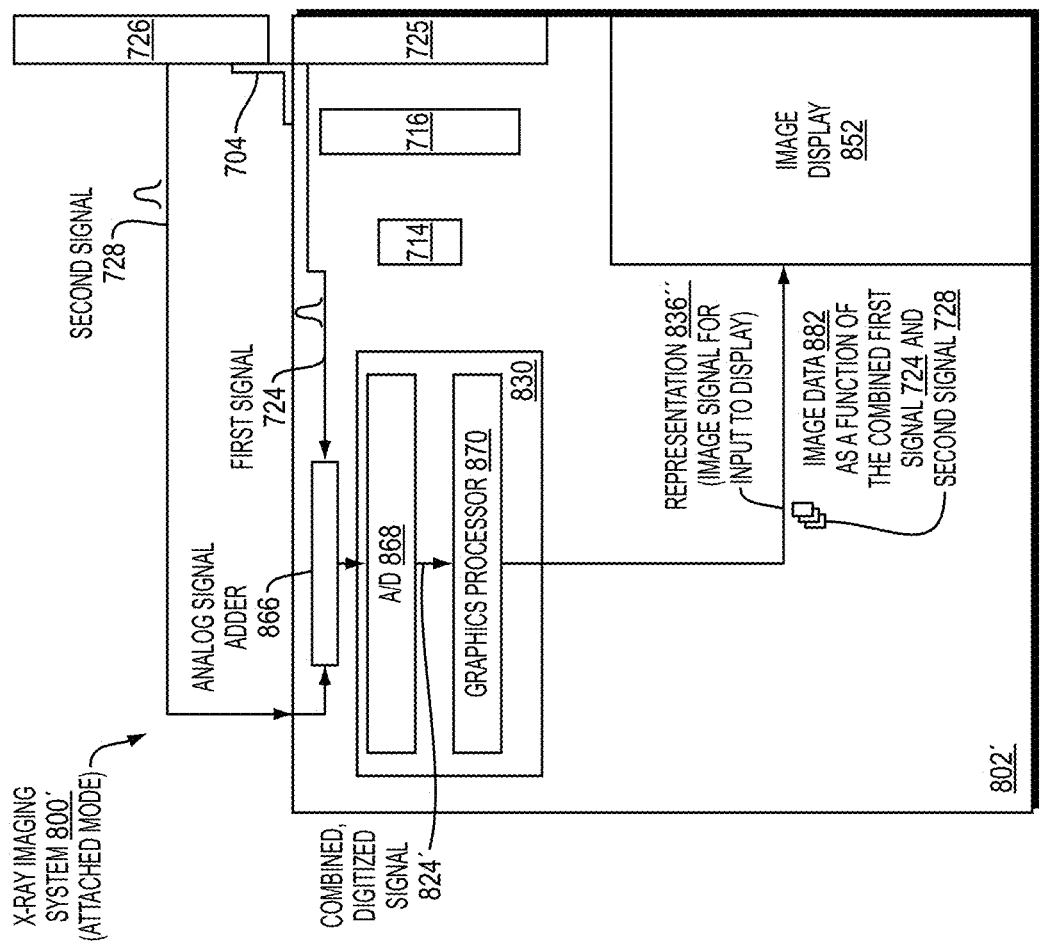
FIG. 8C is a block diagram illustrating an embodiment x-ray imaging system that is slightly modified from the system of FIGS. 8A-8B to include an analog to digital (A/D) converter.

Alternatively, in the attached mode of operation with the second detector 726 attached to the imager 702, the image representation 736 output from the imager 702 may be a function of both signals 724 and 728 by adding the first and second signals together, either electrically, as illustrated in FIG. 8C, or in software, as may be performed by the processor 730, for example, after digitization of the first and second signals, or in firmware. By adding the two signals together, an image representation that is output may have better signal-to-noise ratio than if the representation were based on one signal alone. These various types of output are illustrated for the attached and detached modes of operation at an output block 734 in FIG. 7.

FIG. 8A is a block diagram illustrating an x-ray imaging system 800 being operated in detached mode, with the second backscatter x-ray detector 726 detached from a movable x-ray imager 802. The imager 802 includes an image display 852 on board the imager, similar to the embodiment of FIGS. 1-6. The imager 802 includes a processor 830, which, in turn, includes an A/D converter 868 and a graphics processor 870. In the detached mode of operation illustrated in FIG. 8A, the first signal 724 output from the first detector 725 is received at the A/D converter 868 (a first channel thereof), and a digitized signal 824 is output therefrom. The graphics processor 870 receives the digitized signal 824 and performs all necessary computations for producing image data 872 that can be shown at the image display 852, similar to the image 236 shown on the display 152 in FIG. 2. Accordingly, in this embodiment, the image data 872 constitutes a representation 836 of one or more images of the target (not illustrated in FIG. 8A). The representation 836 is a function only of the first signal, because only the first signal 724 output from the first backscatter x-ray detector 725 was used to produce the image data 872 constituting the representation 836.

FIG. 8B illustrates the system 800 of FIG. 8A operating in attached mode. In this mode, the second signal 728 output from the second detector 726 is received at the imager 802. A second channel of the A/D converter 868 converts the second signal 728 to a digitized signal 829, which is received at the graphics processor 870 for processing. In the attached mode configuration of FIG. 8B, the graphics processor 870 outputs a representation 836' that includes two parts. A first part of the representation 836' includes image data 872 that is a function of the first signal 724 only. A second part of the two-part representation 836' includes complementary image data 874 that is a function of the second signal 728 only. In this manner, the two-part representation 836' includes image data 872 and 874 that are based on the respective first and second signals and first and second detectors alone. Accordingly, at the image display 852, x-ray images of the target 711 may be formed showing both views of the target developed using the first detector 725 and the second detector 726. The image display 852 may show these images sequentially and alternately in time, or it may display the two images side-by-side at the same time, for example.

In embodiments in which the two-part representation 836' is output to an external computer, analyzer, or monitor, such as that illustrated in FIG. 7, the external device may display the two x-ray images, or sets of x-ray images, alternately in time, side-by-side, etc. in the same manner. The second image or series of images is complementary to the first image or set of images in the following manner. Both images or series of images are based on signals acquired from the detectors as the source of x-rays 715 are scanned over the target 711. Source x-rays will be scattered by the target 711 at various depths therein, including shallower depth locations 821 and deeper depth locations 823, as illustrated in FIG. 8B. The first portion 720 of x-rays detected by the first detector 725 will tend to be those that are scattered at shallower depths 821 in the target. On the other hand, the second portion of scattered x-rays 722 detected by the second detector 726 have a greater tendency to be those x-rays that are scattered at the greater depths 823 in the target. In this manner, if signals from the two detectors are treated separately to form distinct images or representations of images, these images will be can provide greater clarity of visualization within the target 711.

FIG. 8C is a block diagram illustrating an x-ray imaging system 800' slightly modified from the system 800 illustrated in FIGS. 8A-8B, to include an analog signal adder 866. The analog signal adder 866 combines the first signal 724 with the second signal 728 such that the analog outputs from both the first and second detectors forms a single analog signal. The single analog signal is input to the A/D converter 868 for digitization, and a combined, digitized signal 824' is output there from. The graphics processor 870 then processes the single, combined, digitized signal 824' to form a representation 836" of one or more images in the form of image data 882 that is a function of the combined first signal 724 and second signal 728. The representation 836", therefore, is a function of both signals combined and can have a greater signal-to-noise ratio than image data based on the first signal alone. Accordingly, when the representation 836", including the image data 882, is input to the image display 852, a clearer, single image or series of images results, with a clearer view of the target 711.

It should be understood that, instead of using the analog signal adder 866, the first and second signals may be digitized separately, as in FIG. 8B, by the A/D converter 868. The graphics processor 870 may then add the digitized signals in software for processing to produce the combined representation 836".

FIG. 8D is a block diagram illustrating an x-ray imaging system 800" operating in attached mode, with the seven the second detector 726 attached to a movable x-ray imager 802". In the embodiment of FIG. 8D, the processing functions present in FIGS. 8A-8C are not present in the imaging system 800". Instead, certain processing functions may be relegated to an external computer/analyzer/monitor 813. The first signal 724 is directly input into a wireless transmitter module 876, which transmits a first representation 836'" to a wireless receiver module 880 of the computer/analyzer/ monitor 813. The first representation 836' is a wireless representation and may be a digital or analog wireless signal. In one embodiment variation, the wireless transmitter module 876 directly converts the first signal 724 from analog electrical form to an analog wireless form, such as an analog radio signal, for example. In another particular variation, the wireless transmitter module 876 includes an A/D converter and processing functions to output the first representation 836'" in the form of a digital wireless signal, such as a Bluetooth® or Wi-Fi™ signal.

The x-ray imaging system 800" further includes a wireless transmitter module 878 that is configured to convert the second signal 728 output from the second detector to a second representation 884 of one or more x-ray images as a wireless signal. The wireless signal, which may take various forms as described in relation to the wireless first representation 836'", may be received directly at the computer analyzer monitor 813 fire the wireless receiver module 880. The computer/analyzer/monitor 813 may then analyze the first, second, or both representations 836'" and 884, respectively, in order to analyze or display image data.

As FIG. 9 is illustrates an x-ray imaging system 900 that includes a robotic arm 986 configured to make an x-ray imager 902 movable without being manually handled by a human. The robotic arm 986 includes a base 990 that allows the arm to rotate with a rotation 944a. Other axes of rotation are provided, such as the pitch rotation 944b, a rotation 944c, and a rotation 944d about various rotational axes. The movable x-ray imager 902 is operable with or without a second detector 926 removably attached thereto. The base 990 may be translatable to provide a translation 942 in one or more dimensions by means of linear stages, for example (not illustrated in FIG. 9). Alternatively, the translation 942 of the robotic arm may be provided by means of the rotations 944a-d about various axes, in combination with each other.

FIG. 10 is a cross-sectional illustration of the interiors of the first and second detector assemblies 125 and 126, respectively, when attached to each other. The first detector assembly includes two sections (two detector panels), separated by the slot 392 through which source x-rays 715 pass. The scintillator two sections of the scintillator material 1090 form a total first active detector area over which a first portion of backscattered x-rays from a target may be detected by the first detector.

FIG. 10 also illustrates a cross-section of the outer loop 656 of the second detector assembly 126, which forms an inner opening the inner opening 658. In the embodiment system of FIGS. 1-6, as illustrated in FIG. 10, the first detector 225 fits inside of the inner opening 658 space, formed by the outer loop 656, and is secured thereto using the bracket 604 illustrated in FIG. 6. The second detector also includes a scintillator material 1088 lining, which forms a second active detector area. In some embodiments, the second active detector area is at least as large as the first active detector area, effectively doubling the active detector area in the attached mode of operation. In other embodiments, the second active detector area is at least four times as large as the first active detector area (for a total, combined active detector area at least five times larger than the first active detector area alone), or at least nine times as large as the first active detector area (for a total, combined active detector area at least ten times larger than the first active detector area alone), for example. Larger second detector areas generally provide for more enhancements of images created from the output of the second detector, either alone or in combination with the output of the first detector.

The scintillator material 1090 is configured to produce light when the first portion of the backscattered x-rays impinges thereon, and the second scintillator material 1088, which may be the same type of material as the scintillator material 1090, is configured to produce light when the second portion of the backscattered x-rays impinges thereon.

Light produced by the scintillator material 1088 forming the second active detector area is then detected by the four PMT detectors 154 illustrated in FIGS. 1 and 6. The PMTs 154 are configured to convert the light into an electrical signal, such as the second signal 728 illustrated in FIG. 7, for example. In the embodiment illustrated in FIGS. 1-6 and 10, the electrical signal is formed by the output of the PMT detectors in the second detector 126, output through the signal connector 660 illustrated in FIG. 6. This electrical signal is the second signal described elsewhere herein, which is representative of the second portion of the backscattered x-rays.

FIG. 11 is a block diagram illustrating a general embodiment x-ray imaging system 1100. The system 1100 includes a movable x-ray imager 1102 that, in turn, includes an attachment feature 1190. The imager 1102 has translation 742 and rotation 744 capabilities during operation, as described hereinabove in relation to FIG. 7, for example.

The x-ray imaging system 1100 further includes a second backscatter x-ray detector 1126, which is removably attachable with the x-ray imager 1102. The second detector 1126 includes an attachment feature 1104. The attachment features 1190 and 1104 are complementary in that, acting together, they are configured to secure, removably, the second backscatter x-ray detector 1126 with the movable x-ray imager 1102 in an arrangement having the second and first backscatter x-ray detectors, 1126 and 1125, respectively, fixedly oriented with respect to each other.

The complementary attachment features 1190 and 1104 may take many different forms, mechanical and otherwise. As an example of complementary mechanical attachment features, the indentation attachment features 390 on the movable x-ray scanner 102 are complementary to the bracket attachment mechanism 604 with clip portion 664, as described in connection with FIGS. 3 and 6. Furthermore, various other complementary mechanical connector components that may be used with embodiments include mechanical latches, straps, snap connectors, pins, rivets, hook and loop fastener components (e.g., Velcro® brand hook and loop fastener strips), etc. Moreover, other complementary attachment features that may be used for embodiments include magnets on a movable x-ray scanner and a second detector, with the magnets oriented with opposing poles facing each other in an attached mode. Alternatively, a magnet may be included on one of either the movable x-ray scanner or the second detector, with a magnetically susceptible material on the other. The magnetically susceptible material may be a ferromagnetic metal or a paramagnetic metal, for example.

Furthermore, the complementary attachment features may be complementary attachment features by which the movable x-ray imager and the second backscatter x-ray detector are removably attachable with each other via removable attachment to a separate mechanical connector that is not part of either the movable x-ray imager or the second backscatter x-ray detector. For example, a bracket, separate from the movable x-ray imager and from the second detector in detached mode, may be used to couple the movable x-ray imager and second detector to each other via features of the movable x-ray imager 1102 and second detector 1126, such as bolt hole features or other hardware. Furthermore, complementary attachment features in some embodiments include dimensions of the movable x-ray imager 1102 and second detector 1126 that provide for a press fit between the imager 1102 and detector 1126, for example. Various other example complementary attachment features are also described hereinafter in connection with FIGS. 13-18.

FIG. 11 may also be understood to illustrate a kit for x-ray imaging, with the imager 1102 and second detector 1126 being components of the kit. It should be understood that in various embodiments, kits can include any of the movable x-ray imagers, second backscatter x-ray detectors, or other system components and features that are disclosed herein.

FIG. 12 is an illustration of a fixed-mount x-ray scanning system used to scan luggage 11 that is moved along a conveyor belt 27. Some of the principles and components described in relation to FIG. 12 can be useful in x-ray scanning system embodiments described hereinabove, particularly in constructing x-ray scanners 716, as illustrated in FIG. 7, with various optional features.

The scanning system in FIG. 12 includes a chopper wheel assembly 1200 that is used in connection with an x-ray tube 14 and attenuating plate 17 to produce a pencil beam 23 that scans the luggage 11 with a vertical sweep as the luggage is moved along the conveyor belt 27. The transmitted pencil beam 23 is detected by a detector 25, which is connected via a cable 26 to an analyzer/monitor 13 that analyzes the detected signals from the detector 25 and displays them to show an image 12 of items within the luggage, such as contraband. In addition, the backscattered x-rays may be detected in backscatter detectors (not shown) positioned on the source side of the system.

The chopper wheel assembly 1200 of FIG. 12 particularly includes a disk chopper wheel 101 with radial slits 121. The disk chopper wheel is secured to a chopper wheel mount 105 by a rotation axis of the disk chopper wheel 101 to allow chopper wheel rotation 24. The assembly 100 also includes a source-side scatter plate 103 that defines an open slot 107 therein. The source-side scatter plate 103 is secured by a support structure 1202 to be substantially parallel to the rotation plane of the disk chopper wheel 101 with a source-side gap between the source-side scatter plate and the source side of the disk chopper wheel.

The disk chopper wheel 101 is configured to rotate with a rotation 24 about a rotation axis that is perpendicular to a rotation plane of the disk chopper wheel. The wheel 101 has a solid cross-sectional area in the rotation plane. The disk chopper wheel 101 is configured to absorb x-ray radiation received from an x-ray source (here, the x-ray tube 14) at a source side of the disk chopper wheel (the side of the chopper wheel closest to the x-ray tube source 14). However, when the radial slit openings 121 in the disk chopper wheel 101 intersect with the open slot 107 in the source-side scatter plate 103 along the direction of travel of the x-rays 15, then the pencil beam 23 may pass through the source-side scatter plate 103 and disk chopper wheel 101 to an output side of the disk chopper wheel. The radial slit openings in the disk chopper wheel 101 and in chopper wheels in other assemblies may have chamfered edges and may also may be tapered, as described in International Application PCT/US2015/061952, filed on Nov. 20, 2015, and published with International Publication Number WO 2016/081881 A1, which is incorporated herein by reference in its entirety.

Further in reference to FIG. 12, the source-side scatter plate 103 has a solid cross-sectional area in a plane that is parallel to the rotation plane of the disk chopper wheel. The source-side scatter plate 103 is configured to absorb x-ray radiation at solid portions of the plate, and also pass x-ray radiation through an open slot 107 to produce the pencil beam 23. In particular, in the assembly of FIG. 12, the source-side scatter plate is configured to output a fan beam 16 of x-rays through the open slot 107, and the assembly, including the scatter plate 103 and chopper wheel 101, may be configured to output the pencil beam 23.

The source-side scatter plate 103 may be formed of tungsten, another material having a high Z (atomic number), or an alloy of one of these materials, etc. The source-side scatter plate may have a thickness in certain embodiments on the order of 1.0 mm, for example.

Advantageously, the solid cross-sectional area of the source-side scatter plate may be substantially smaller than the solid cross-sectional area of the disk chopper wheel. The substantially smaller source-side scatter plate having the features described herein results in confinement of scattered x-rays that is similar to that obtained in other designs that utilize a full enclosure. The scatter plate also provides for substantially reduced weight of a chopper wheel assembly, facilitating handheld x-ray scanning.

The cross-sectional area of the source-side scatter plate 103 may be in a range of about 100% to about 5,000% larger than an open cross-sectional area of one of the radial slit openings 121 in the disk chopper wheel, for example. However, in yet other embodiments, the source-side scatter plate cross-sectional area may be in a range of, for example, 500% to 10,000% larger than the cross-sectional area of a radial slit opening in the chopper wheel. In general, the cross-sectional area of the source-side scatter plate should be sufficient to intersect the entire fan beam 16 with the exception of part of the fan beam incident at the open slot 107. In this manner, at any orientation of a radial slit 121, only a pencil beam 23 can emerge from the chopper wheel when a portion of a radial slit 121 is aligned with a portion of the open slot 107. The source-side scatter plate 103 may be formed of pure or alloyed lead, tin, iron, tungsten, or another high Z material, for example.

While the assembly 1200 of FIG. 12 includes only a source-side scatter plate 103 for confinement of scattered x-rays, in other embodiments, an output-side scatter plate may also be included. The output-side scatter plate, like the source-side scatter plate, can have a solid cross-sectional area in a plane parallel to the rotation plane of the disk chopper wheel that is, where the solid cross-sectional area of the output-side scatter plate is substantially smaller than the solid cross-sectional area of the disk chopper wheel. Furthermore, the output-side scatter plate may be configured to absorb, like the source-side scatter plate, x-ray radiation and may define an open slot therein, like the open slot 107, that is configured to pass x-ray radiation. Moreover, while the source-side scatter plate 103 is a single-layered plate, other source-side or output-side scatter plates within the scope of embodiments may include multi-layered plates. It should be noted that an output-side scatter plate may have any of the other characteristics described herein for the source-side scatter plate.

The support structure 1202 that secures the source-side scatter plate 103 may be advantageously formed of aluminum or another lightweight material. This is because the support structure 1202 need not be relied upon for x-ray shielding or scattering confinement. Instead, the source-side scatter plate 103 (and in other embodiments, the output-side scatter plate) perform this function. Again, the limited size of the source-side scatter plate relative to the disk chopper wheel, together with the ability of other components such as the chopper wheel mount 105 and support structure 1202 to be formed of lightweight materials, enable dramatically lower weight for various types of x-ray scanning systems, such as the handheld scanner 155 of FIG. 1. Embodiment support structures may be configured to support bearings on a disk chopper wheel that rotates. Support structures may also be configured to support a drive motor that rotates the chopper wheel.

Embodiment x-ray assemblies may be used in systems using a wide range of x-ray energies. An x-ray source such as the x-ray tube 14 may be configured to output x-rays having an end-point energy in a range of about 120 kiloelectron volts (keV) to about 450 keV, for example. Furthermore, in other embodiments, this energy range may be between about 120 keV and about 160 keV, for example. In particular, handheld scanning systems, such as the system 100 of FIG. 1, may use x-rays on the lower end of this energy region, for example 120 keV.

Figure 13:
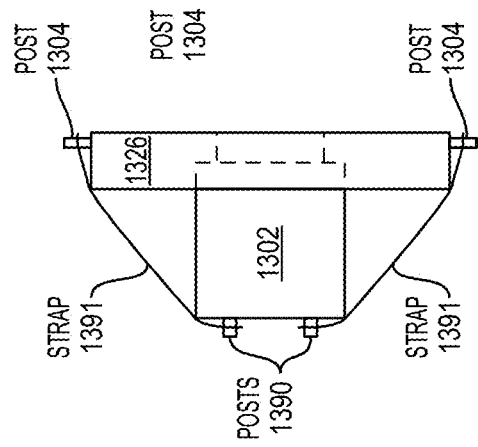
FIG. 13 is a side-view illustration of an embodiment x-ray imaging system in which complementary post features are used with a strap to secure a second backscatter x-ray detector to a movable x-ray imager.

FIG. 13 is a side-view illustration of an embodiment x-ray imaging system in which straps 1391 are used to secure a second backscatter x-ray detector 1326 to a movable x-ray imager 1302. For convenience of illustration, and in order to highlight attachment features, first backscatter x-ray detectors are not specifically illustrated in FIGS. 13-18. However, it should be understood that each of these each of the embodiments illustrated in FIGS. 13-18 includes a movable x-ray imager having a first backscatter x-ray detector.

The x-ray imager 1302 in FIG. 13 includes posts 1390, and the second detector 1326 includes posts 1304. The posts 1390 and 1304 are complementary attachment features to which the straps 1391 are configured to be secured for ease of attachment and detachment of the second detector 1326 to the imager 1302. In this embodiment, the posts 1390 and 1304 on the x-ray imager and second detector, respectively, are mechanically similar features. However, in other embodiments, the complementary attachment features of the x-ray imager and second detector are very different, yet still complementary, working with each other to permit removably securing the second backscatter x-ray detector with the movable x-ray imager in an arrangement such that the first and second backscatter x-ray detectors are oriented in a common direction (are oriented, fixedly with respect to each other in order to detect backscatter x-rays from a common target).

Figure 14:
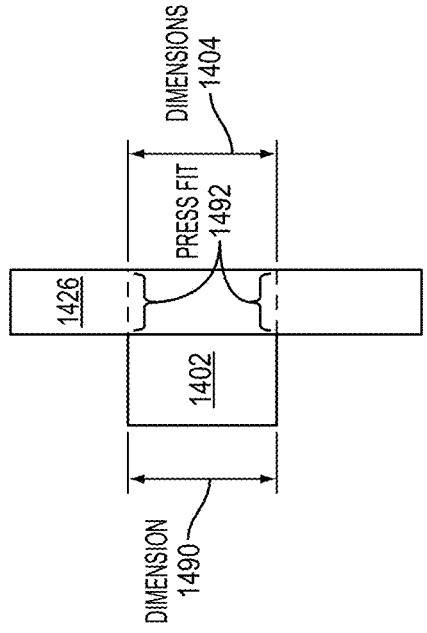
FIG. 14 is a side-view illustration of an embodiment x-ray imaging system employing press fit dimensions as complementary attachment features.

FIG. 14 is a side-view illustration of an embodiment x-ray imaging system including a movable x-ray imager 1402 and second backscatter x-ray detector 1426 that employs a press fit 1492 in order to be removably attachable with each other. Complementary attachment features include a dimension 1490 of the x-ray imager 1402 and a dimension 1404 of an opening in the second detector 1426. Together, these two dimensions 1490 and 1404 are such that, when the x-ray imager 1402 is pushed into an opening in the second detector 1426, the imager 1402 and second detector 1426 have a press fit that secures them with respect to each other during operation, but which also permits the x-ray imager 1402 to be pulled out of the opening in the second detector 1426.

Figure 15:
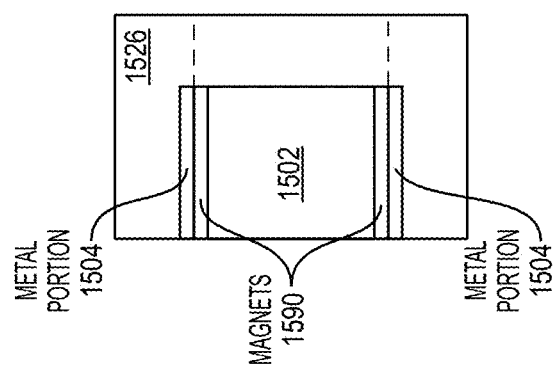
FIG. 15 is a side-view illustration of an embodiment x-ray imaging system including a magnet and metal layer as complementary attachment features to secure, removably, an x-ray imager with a second detector.

FIG. 15 is a side-view illustration of an embodiment x-ray imaging system having an x-ray imager 1502 and a second detector 1526 removably attachable with each other via magnetic means. In particular, the x-ray imager 1502 includes magnets 1590, and the second detector 1526 includes metal portions 1504 that are configured to mate mechanically with the magnets 1590 in the attached mode that is illustrated. In order to detach the second detector 1526 from the x-ray imager 1502, the second detector 1526 may be pulled away from the x-ray imager 1502. In other embodiments, the magnets 1590 are provided on the second detector, and the metal portions 1504 are provided on the x-ray imager 1502. In still other embodiments, both the x-ray imager and the second detector include magnets that are oriented with opposite poles toward each other.

Figure 16:
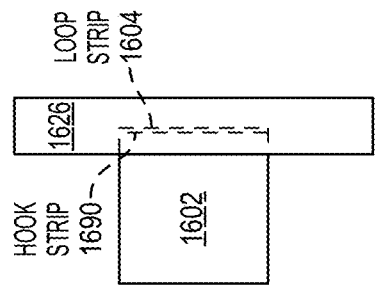
FIG. 16 is a side-view illustration of an embodiment x-ray imaging system including hook and loop fasteners as complementary attachment features to make a movable x-ray imager and a second backscatter x-ray detector removably attachable with each other.

FIG. 16 is a side-view illustration of an embodiment x-ray imaging system including a movable x-ray imager 1602 and a second backscatter x-ray detector 1626 that are removably attachable with each other via hook and loop fastener components. In particular, the imager 1602 includes a hook strip 1690 that is configured to be pressed into a loop strip 1604 on the second detector 1626 for attachment. Velcro® brand hook and loop fasteners are an example, but other types of hook and loop fasteners may be used as well.

The hook strip 1690 and loop strip 1604 are complementary attachment features that are configured to secure, removably, the second backscatter x-ray detector 1626 with the movable x-ray imager 1602 in enumerate in an arrangement wherein the imager 1602 and second detector 1626 are fixedly and removably oriented with respect to each other in a common direction, such that they can both receive backscattered x-rays from a common target.

FIG. 17 is a side-view illustration of an embodiment x-ray imaging system that includes a movable x-ray imager 1702 and a second backscatter x-ray detector 1726 that are removably attachable with each other via snap disc connectors 1790 and 1704. Snap connectors are known for use in place of buttons on clothing and in other mechanical applications, for example. In particular, the x-ray imager 1702 includes snap discs with grooves 1790, while the second detector 1726 includes snap discs with lips 1704. The snap discs with lips 1704 are configured to be pressed into the snap discs with grooves 1790, such that, with some minor force, the lips are secured into the grooves. Conversely, for detachment, when a certain amount of force is applied to pull the second detector 1726 away from the x-ray imager 1702, then the lips escape from the grooves, permitting detachment and use of the x-ray imager 1702 alone. The snap discs with grooves 1790 and snap discs with lips 1704 are complementary attachment features that secure, removably, the second backscatter x-ray detector 1726 with the movable x-ray imager 1702 in an arrangement such that the second and first backscatter x-ray detectors are oriented in a common direction to receive and detect x-rays that are backscattered from a common target.

FIG. 18 is a side-view illustration of an embodiment x-ray imaging system that includes a movable x-ray imager 1802 and a second backscatter x-ray detector 1826 that are removably secured to each other via mechanical brackets 1892. The second backscatter x-ray detector 1826 has two parts, each of which is secured to one side of the x-ray imager 1802 by a respected bracket 1892. The x-ray imager 1802 has bolts 1890 that are built into a housing of the x-ray imager 1802. For attachment to the bracket 1892, the bracket 1892 may be slipped over the bolts and secured, removably, with wing nuts (not shown in FIG. 18) that may be tightened by hand, for example. Alternatively, regular nuts that require use of a tool for removal may be used.

The second detector 1826 in FIG. 18 includes threaded bolt holes 1804 that are configured to receive separate bolts 1890 inserted through the brackets 1892 and into the threaded bolt holes 1804 for securing the bracket 1892 to the second detector 1826. The bracket 1892 in this embodiment does not form part of either the x-ray imager 1802 or the second detector 1826. Instead, the bolts 1890 built into the housing of the x-ray imager 1802 and the threaded bolt holes 1804 in the second detector 1826 are complementary attachment features that allow the second detector 1826 to be removably secured to the x-ray imager 1802 via removable attachment to the separate mechanical connector brackets 1892.

FIG. 19. is a cross-sectional, end-view illustration of embodiment x-ray imaging system including a second backscatter x-ray detector 1926 with a partial outer loop 1956 that forms an inner opening 1958. The system also includes a movable x-ray imager 1902. The view of FIG. 19 is similar to the view of FIG. 10 for the embodiment system of FIGS. 1-6, illustrating, in cross section, active x-ray detector areas for the first x-ray detector, which forms part of the movable x-ray imager 1902, and for the second detector 1926. While FIG. 19 does not illustrate a slot for source x-rays to exit the imager 1902, as illustrated in FIG. 10, it should be understood that the imager 1902 can include such a slot.

The imager 1902 of FIG. 19 is substantially circular in its end-view shape and has dimensions such that it fits, removably, within the inner opening 1958 formed by the partial output loop 1956. The fit may be a press fit, such that no other mechanical components are necessary to secure the imager 1902 with the second detector 1926. Alternatively, the fit may be loose, and other attachment features may be employed to secure the movable x-ray imager 1902 with the second detector 1926 and to facilitate mutual detachment from one another.

FIGS. 20A, 20B, and 20C illustrate various aspects of an embodiment x-ray imaging system 2000. The system 2000 includes a movable x-ray scanning module 2094. The scanning module 2094 includes an x-ray source configured to output a source of x-rays (not shown), such as the x-ray source 714 illustrated in FIG. 7. The movable x-ray scanning module 2094 further includes a scanner that is configured to scan the source of x-rays over a target (scanner and target not illustrated in FIG. 20A-20C), such as the scanner 716 illustrated in FIG. 7, the scanner assembly 1200 illustrated in FIG. 12, and the target 711 illustrated in FIG. 7, respectively, for example. The system 2000 further includes a first backscatter x-ray detector assembly 2025 and a second backscatter x-ray detector assembly 2026. The movable x-ray scanning module 2094 further includes attachment features 1104, and each of the first and second backscatter x-ray detector assemblies 2025 and 2026 includes respective complementary attachment features 1104 that are configured to secure, removably, the respective detector assemblies 2025 and 2026 with the movable x-ray scanning module 2094 in an interchangeable matter.

In particular, as illustrated in FIG. 20A, the first detector 2025 may be removably secured to the scanning module 2094 for x-ray scanning in a first mode of operation with the first detector 2025 assembly attached. Alternatively, the first detector assembly 2025 may be removed, and the second detector assembly 2026 may be removably attached to the scanning module 2094 in order to perform x-ray scanning without the first detector 2025. The interchangeability of the detectors provides multiple benefits, such as the ability to try different types of detectors for scanning different targets. Furthermore, as illustrated in FIGS. 20A and 20B, which should be understood to be at similar scales, the second detector 2026 is much larger than the first detector assembly 2025 and has a much larger, second active detector area than a first active detector area of the first detector assembly 2025. Interchanging the two detectors 2025 and 2026 allows for use of the first detector 2025 in cramped scanning application environments, such as illustrated in FIG. 4, where there is not sufficient space to maneuver a large detector, while still allowing scanning in a second mode of operation, or second attached mode of operation, with the second detector 2026 attached, taking advantage of a larger active detector area for greater imaging sensitivity where in environments in which there is room to maneuver the larger, second detector 2026 with the scanning module 2094. Such an environment is illustrated in FIG. 5, wherein both a first detector and a second detector are attached in a different embodiment.

As illustrated in FIG. 20A, the movable scanning module 2094 can be translated and rotated, either by being handheld during scanning operations, or by being mounted on a robotic arm, similar to the manner described for the embodiments of FIGS. 1-6 and the embodiment of FIG. 9, respectively. Rotation and translation 744 and 742 are further described in connection with FIGS. 7 and 11, and similar principles apply to the scanning module 2094 with either the first or second detector 2025 or 2026, respectively, attached thereto for operation. Furthermore, the signal processing, signal transmission, image rendering, and image representation output described in connection with FIGS. 7 and 8A-8D are similar for the embodiment of FIGS. 20A-20C, with the exception that the embodiments of FIGS. 20A-20C may output only one signal, such as the second signal 728 or the first signal 724 illustrated in FIG. 7, since only one of the detectors 2025 and 2026 is attached to the scanning module 2094 for operation of the system 2000 at any given time.

Furthermore, similar considerations apply with respect to complementary attachment features. Complementary attachment features are described hereinabove in connection with FIGS. 1-6, 7, 11, and 13-19, for example, and similar features may be provided for the embodiment system 2000. Accordingly, the complementary attachment features 1190 form part of the scanning module 2094, which are complementary with attachment features 1104 that form part of the first and second detectors 2025 and 2026, respectively. Accordingly, any of the complementary attachment features described in connection with other embodiments may be used for the embodiment of FIGS. 20A-20C.

Figure 21:
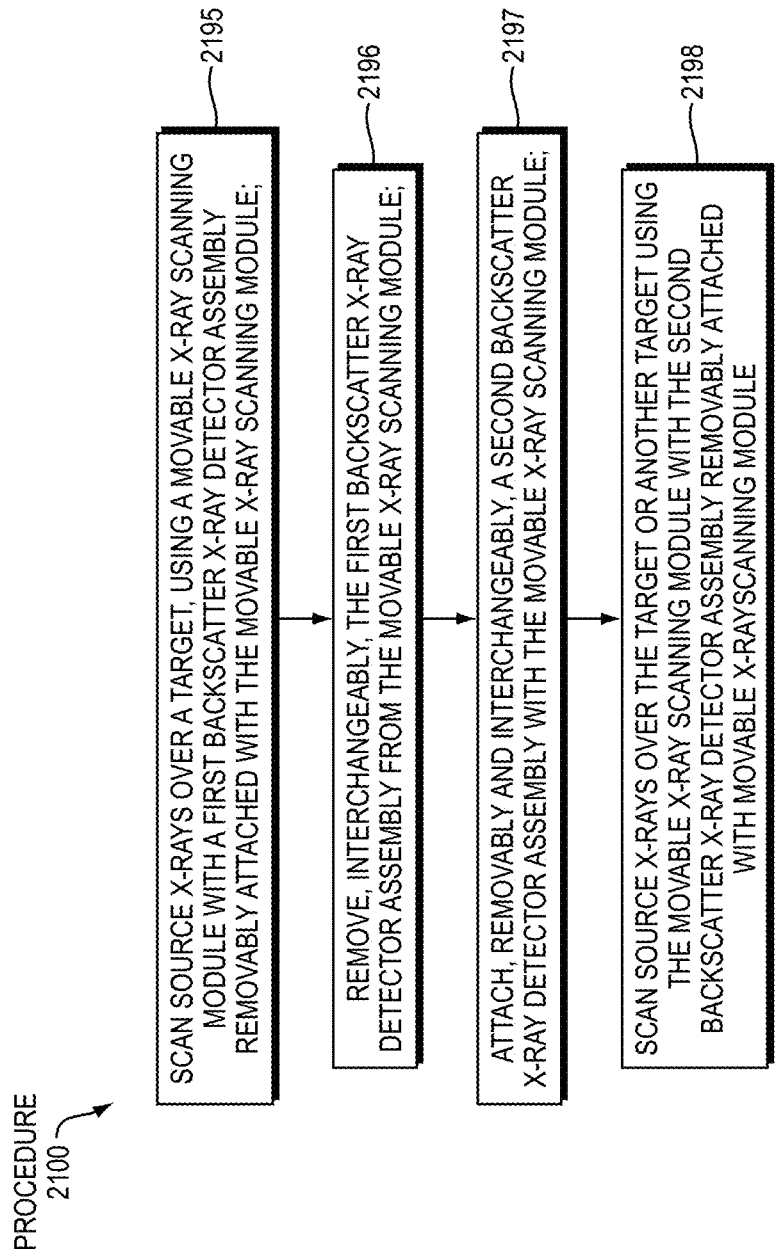
FIG. 21 is a flow diagram illustrating a procedure for x-ray imaging by scanning with a given x-ray scanning module using two different detector assemblies in turn.

FIG. 21 is a flow diagram illustrating a procedure 2100 for x-ray imaging. At 2195, source x-rays are scanned over a target, using a movable x-ray scanning module with a first backscatter x-ray detector assembly removably attached with the movable x-ray scanning module. The moving the movable x-ray scanning module, first backscatter x-ray detector assembly, and target may be as described in connection with FIGS. 20A-20C or any other embodiments described hereinabove, for example.

At 2196, the first backscatter x-ray detector assembly is removed, interchangeably, from the movable x-ray scanning module. Any of the complementary attachment features described hereinabove in connection with any embodiment may be used for this interchangeable removal.

At 2197, a second backscatter x-ray detector assembly is removably and interchangeably attached with the movable x-ray scanning module. Here, similarly, any of the complementary attachment features described hereinabove may enable this removable and interchangeable attachment.

At 2198, source x-rays are scanned over the target, or another target, using the movable x-ray scanning module with the second backscatter x-ray detector assembly removably attached with the movable x-ray scanning module.

Items:

Item 1: An x-ray imaging system comprising: a movable x-ray imager including a first backscatter x-ray detector assembly; and a second backscatter x-ray detector assembly that is removably attachable with the movable x-ray imager, the movable x-ray imager and the second backscatter x-ray detector assembly including complementary attachment features configured to secure, removably, the second backscatter x-ray detector assembly with the movable x-ray imager in an arrangement having the second and first backscatter x-ray detector assemblies fixedly oriented with respect to each other.

Item 2. The x-ray imaging system of item 1, wherein the movable x-ray imager is configured to be handheld during operation.

Item 3. The x-ray imaging system of item 1, further comprising a robotic arm, and wherein the movable x-ray imager is configured to be attached to the robotic arm, the robotic arm configured to translate and rotate the movable x-ray imager during operation.

Item 4. The x-ray imaging system of item 1, wherein the complementary attachment features are complementary mechanical connector components.

Item 5. The x-ray imaging system of item 4, wherein the complementary mechanical connector components are mechanical latch, strap, snap, rivet, pin, or hook and loop fastener components.

Item 6. The x-ray imaging system of item 1, wherein the complementary attachment features are magnets or a magnet and a magnetically susceptible material.

Item 7. The x-ray imaging system of item 1, wherein the complementary attachment features are complementary attachment features by which the movable x-ray imager and the second backscatter x-ray detector assembly are removably attachable with each other via removable attachment to a mechanical connector.

Item 8. The x-ray imaging system of item 1, wherein the second backscatter x-ray detector assembly forms an outer loop defining an inner opening at which the movable x-ray imager is configured to be received for attachment of the second backscatter x-ray detector assembly with the movable x-ray imager, a size and shape of the movable x-ray imager being complementary to a size and shape of the outer loop defining the inner opening.

Item 9. The x-ray imaging system of item 8, wherein the movable x-ray imager is configured to be inserted into the inner opening of the second backscatter x-ray detector assembly and retained therein via the complementary attachment features.

Item 10. The x-ray imaging system of item 8, wherein the outer loop is a partial outer loop.

Item 11. The x-ray imaging system of item 8, wherein the outer loop is a closed outer loop.

Item 12. The x-ray imaging system of item 1, wherein the first backscatter x-ray detector assembly includes a first active detector area, and wherein the second backscatter x-ray detector assembly includes a second active detector area at least as large as the first detector area.

Item 13. The x-ray imaging system of item 12, wherein the second active detector area is at least four times as large as the first active detector area.

Item 14. The x-ray imaging system of item 13, wherein the second active detector area is at least nine times as large as the first active detector area.

Item 15. The x-ray imaging system of item 1, wherein: the handheld x-ray imager further includes: an x-ray source configured to output source x-rays; a scanner configured to scan the source x-rays over a target; a processor; and a display, and wherein: the first backscatter x-ray detector assembly is configured to detect a first portion of backscattered x-rays that are backscattered from the target and to output a first signal representative of the first portion of backscattered x-rays; the processor is configured to process the first signal to form an image of the target at the display; and the second backscatter x-ray detector assembly is configured to detect a second portion of the backscattered x-rays and output a second signal representative of the second portion of backscattered x-rays, the second signal communicatively coupled to the handheld x-ray imager, wherein the handheld x-ray imager is configured to process the second signal to enhance the image of the target at the display.

Item 16. The x-ray imaging system of item 15, wherein the handheld x-ray imager is configured to process the second signal to enhance the image by combining the first and second signals electrically or in software to form a combined signal, and wherein the processor is configured to process the combined signal to form the image of the target.

Item 17. The x-ray imaging system of item 15, wherein the handheld x-ray imager is configured to process the second signal to enhance the image by processing the second signal separate from the first signal to form a complementary x-ray image of the target.

Item 18. The x-ray imaging system of item 1, wherein: the movable x-ray imager includes an x-ray source configured to output source x-rays, and a scanner configured to scan the source x-rays over a target; the first backscatter x-ray detector assembly is configured to detect a first portion of backscattered x-rays that are backscattered from the target and to output a first signal representative of the first portion of backscattered x-rays; the second backscatter x-ray detector assembly is configured to detect a second portion of the backscattered x-rays and to output a second signal representative of the second portion of backscattered x-rays; and the movable x-ray imager, the second backscatter x-ray detector assembly, or a combination of the movable x-ray imager and the second backscatter x-ray detector assembly is configured to output a representation of one or more images of the target according to the following alternative configurations: wherein, in a detached mode of operation with the second backscatter x-ray detector assembly detached from the x-ray imager, the representation of the one or more images of the target is a function of the first signal, and wherein, in an attached mode of operation with the second backscatter x-ray detector assembly attached to the x-ray imager, the representation of the one or more images of the target is at least one of (i) the function of the first signal, (ii) a function of the second signal, or (iii) a function of the first and second signals.

Item 19. The x-ray imaging system of item 18, wherein, in the attached mode of operation, the second signal is communicatively coupled to the movable x-ray imager, and the movable x-ray imager is configured to combine the first and second signals electrically or in software to form the representation of the one or more images, the movable x-ray imager further configured to output the representation of each image of the one or more images as a function of the first and second signals combined, accordingly.

Item 20. The x-ray imaging system of item 18, wherein, in the attached mode of operation, the representation is a two-part representation of two or more images of the target, a first part of the two-part representation being of a first image of the two or more images as a function of the first signal, and a second part of the two-part representation being of a complementary, second image of the two or more images as a function of the second signal.

Item 21. The x-ray imaging system of item 18, wherein the movable x-ray imager includes an image display, and wherein the movable x-ray imager is configured to output the representation of the one or more images of the target to the image display such that a person can view the one or more images.

Item 22. The x-ray imaging system of item 18, wherein the movable x-ray imager includes a transmitter module configured to transmit, via a cable or wirelessly, the representation of the one or more images of the target to an external computer, analyzer, or monitor.

Item 23. The x-ray imaging system of item 18, wherein the second backscatter x-ray detector assembly includes a transmitter module configured to transmit the second signal, via a cable or wirelessly, to an external computer, analyzer, or monitor.

Item 24. The x-ray imaging system of item 18, wherein the second signal is communicatively coupled to the movable x-ray imager, or wherein the first signal is communicatively coupled to the second backscatter x-ray detector assembly.

Item 25. The x-ray imaging system of item 18, wherein the second backscatter x-ray detector assembly defines a hollow cavity and further includes (i) a scintillator material lining the hollow cavity, the scintillator material configured to produce light when the second portion of the backscattered x-rays impinges thereon, and (ii) one or more photodetectors configured to convert the light into an electrical signal, the electrical signal being the second signal representative of the second portion of the backscattered x-rays.

Item 26. The x-ray imaging system of item 18, wherein the second backscatter x-ray detector assembly includes (i) a scintillator material configured to produce light when the second portion of the backscattered x-rays impinges thereon, (ii) a plurality of wavelength-shifting optical light guides configured to collect the light, and (iii) one or more photodetectors configured to convert the light into an electrical signal, the electrical signal being the second signal representative of the second portion of the backscattered x-rays.

Item 27. The x-ray imaging system of item 18, wherein the second backscatter x-ray detector assembly includes a wired or wireless interface configured to output analog or digital signals to the movable x-ray imager, the analog or digital signals corresponding to the second portion of the backscattered x-rays.

Item 28. The x-ray imaging system of item 18, wherein the second backscatter x-ray detector assembly includes a wired or wireless interface configured to output analog or digital signals to a remote computer, analyzer, or monitor, the analog or digital signals corresponding to the second portion of the backscattered x-rays.

Item 29. The x-ray imaging system of item 18, wherein the representation of the one or more x-ray images includes the first signal, the second signal, an electrical or software combination of the first and second signals, or a digital signal representation of the one or more images.

Item 30. The x-ray imaging system of item 18, wherein the representation of the one or more x-ray images includes a video signal.

Item 31. An x-ray imaging kit comprising: a movable x-ray imager including a first backscatter x-ray detector assembly; and a second backscatter x-ray detector assembly that is removably attachable with the movable x-ray imager, the movable x-ray imager and the second backscatter x-ray detector assembly including complementary attachment features configured to secure, removably, the second backscatter x-ray detector assembly with the movable x-ray imager in an arrangement having the second and first backscatter x-ray detector assemblies fixedly oriented with respect to each other.

Item 32. An x-ray imaging system comprising: means for x-ray imaging by detecting a first portion of backscattered x-rays that are backscattered from a target, the means for x-ray imaging being movable; means for detecting a second portion of the backscattered x-rays; and means for securing, removably, the means for detecting the second portion of the backscattered x-rays with the means for x-ray imaging, the means for x-ray imaging being operable for x-ray imaging both (i) with the means for detecting the second portion secured to the means for x-ray imaging and (ii) with the means for detecting the second portion detached from the means for x-ray imaging.

Item 33. An x-ray imaging system comprising: a movable x-ray scanning module including an x-ray source configured to output source x-rays, a scanner configured to scan the source x-rays over a target, and an attachment feature; a first backscatter x-ray detector assembly; and a second backscatter x-ray detector assembly, each of the first and second backscatter x-ray detector assemblies including respective complementary attachment features configured to secure, removably, the respective detector assemblies with the movable x-ray scanning module in an interchangeable manner.

Item 34. The x-ray imaging system of item 33, wherein the second detector assembly has a second active detector area at least twice as large as a first active detector area of the first detector assembly.

Item 35. The x-ray imaging system of item 33, wherein the movable x-ray scanning module is configured to be handheld during scanning the source x-rays over the target.

Item 36. An item of x-ray imaging comprising: scanning source x-rays over a target, using a movable x-ray scanning module with a first backscatter x-ray detector assembly removably attached with the movable x-ray scanning module; removing, interchangeably, the first backscatter x-ray detector assembly from the movable x-ray scanning module; attaching, removably and interchangeably, a second backscatter x-ray detector assembly with the movable x-ray scanning module; and scanning source x-rays over the target or another target using the movable x-ray scanning module with the second backscatter x-ray detector assembly removably attached with the movable x-ray scanning module.

Item 37. The item of x-ray imaging of item 36, wherein scanning source x-rays with the first detector assembly removably attached includes detecting backscatter x-rays with a first active detector area, and wherein scanning source x-rays with the second detector assembly removably attached includes detecting backscatter x-rays with a second active detector area at least twice as large as the first active detector area.

Item 38. The item of x-ray imaging of item 36, further comprising holding the movable x-ray scanning module using one or more human hands during the scanning source x-rays with the first and second detector assemblies removably attached to the movable x-ray scanning module.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An x-ray imaging system comprising:
a movable x-ray imager including a first backscatter x-ray detector assembly; and
a second backscatter x-ray detector assembly that is removably attachable with the movable x-ray imager, the movable x-ray imager and the second backscatter x-ray detector assembly including complementary attachment features configured to secure, removably, the second backscatter x-ray detector assembly with the movable x-ray imager to form an attached arrangement having the second and first backscatter x-ray detector assemblies fixedly oriented with respect to each other, wherein the second backscatter x-ray detector assembly forms an outer loop defining an inner opening at which the movable x-ray imager is configured to be received for attachment of the second backscatter x-ray detector assembly with the movable x-ray imager to form the attached arrangement.

2. The x-ray imaging system of claim 1, wherein the movable x-ray imager is configured to be handheld during operation.

3. The x-ray imaging system of claim 1, further comprising a robotic arm, and wherein the movable x-ray imager is configured to be attached to the robotic arm, the robotic arm configured to translate and rotate the movable x-ray imager during operation.

4. The x-ray imaging system of claim 1, wherein the complementary attachment features are complementary mechanical connector components.

5. The x-ray imaging system of claim 4, wherein the complementary mechanical connector components are mechanical latch, strap, snap, rivet, pin, or hook and loop fastener components.

6. The x-ray imaging system of claim 1, wherein the complementary attachment features are magnets or a magnet and a magnetically susceptible material.

7. The x-ray imaging system of claim 1, wherein the complementary attachment features are complementary attachment features by which the movable x-ray imager and the second backscatter x-ray detector assembly are removably attachable with each other via removable attachment to a mechanical connector.

8. The x-ray imaging system of claim 1, wherein the movable x-ray imager is configured to be inserted into the inner opening of the second backscatter x-ray detector assembly and retained therein via the complementary attachment features.

9. The x-ray imaging system of claim 1, wherein the outer loop is a partial outer loop.

10. The x-ray imaging system of claim 1, wherein the outer loop is a closed outer loop.

11. The x-ray imaging system of claim 1, wherein the first backscatter x-ray detector assembly includes a first active detector area, and wherein the second backscatter x-ray detector assembly includes a second active detector area at least as large as the first detector area.

12. The x-ray imaging system of claim 11, wherein the second active detector area is at least four times as large as the first active detector area.

13. The x-ray imaging system of claim 12, wherein the second active detector area is at least nine times as large as the first active detector area.

14. The x-ray imaging system of claim 1, wherein:
the movable x-ray imager further includes:
an x-ray source configured to output source x-rays;
a scanner configured to scan the source x-rays over a target;
a processor; and
a display,
and wherein:
the first backscatter x-ray detector assembly is configured to detect a first portion of backscattered x-rays that are backscattered from the target and to output a first signal representative of the first portion of backscattered x-rays;

the processor is configured to process the first signal to form an image of the target at the display; and the second backscatter x-ray detector assembly is configured to detect a second portion of the backscattered x-rays and output a second signal representative of the second portion of backscattered x-rays, the second signal communicatively coupled to the movable x-ray imager, wherein the movable x-ray imager is configured to process the second signal to enhance the image of the target at the display.

15. The x-ray imaging system of claim 14, wherein the movable x-ray imager is configured to process the second signal to enhance the image by combining the first and second signals electrically or in software to form a combined signal, and wherein the processor is configured to process the combined signal to form the image of the target.

16. The x-ray imaging system of claim 14, wherein the movable x-ray imager is configured to process the second signal to enhance the image by processing the second signal separate from the first signal to form a complimentary x-ray image of the target.

17. The x-ray imaging system of claim 1, wherein:

the movable x-ray imager includes an x-ray source configured to output source x-rays, and a scanner configured to scan the source x-rays over a target;

the first backscatter x-ray detector assembly is configured to detect a first portion of backscattered x-rays that are backscattered from the target and to output a first signal representative of the first portion of backscattered x-rays;

the second backscatter x-ray detector assembly is configured to detect a second portion of the backscattered x-rays and to output a second signal representative of the second portion of backscattered x-rays; and the movable x-ray imager, the second backscatter x-ray detector assembly, or a combination of the movable x-ray imager and the second backscatter x-ray detector assembly is configured to output a representation of one or more images of the target according to the following alternative configurations:

wherein, in a detached mode of operation with the second backscatter x-ray detector assembly detached from the x-ray imager, the representation of the one or more images of the target is a function of the first signal, and wherein, in an attached mode of operation with the second backscatter x-ray detector assembly attached to the x-ray imager, the representation of the one or more images of the target is at least one of (i) the function of the first signal, (ii) a function of the second signal, or (iii) a function of the first and second signals.

18. The x-ray imaging system of claim 17, wherein, in the attached mode of operation, the second signal is communicatively coupled to the movable x-ray imager, and the movable x-ray imager is configured to combine the first and second signals electrically or in software to form the representation of the one or more images, the movable x-ray imager further configured to output the representation of each image of the one or more images as a function of the first and second signals combined, accordingly.

19. An x-ray imaging system comprising:

means for x-ray imaging by detecting a first portion of backscattered x-rays that are backscattered from a target, the means for x-ray imaging being movable;

means for detecting a second portion of the backscattered x-rays; and means for securing, removably, the means for detecting the second portion of the backscattered x-rays with the means for x-ray imaging to form an attached arrangement having the means for detecting the second portion and the means for x-ray imaging fixedly oriented with respect to each other, the means for x-ray imaging being operable for x-ray imaging both (i) with the means for detecting the second portion secured, removably, to the means for x-ray imaging to form the attached arrangement and (ii) with the means for detecting the second portion detached from the means for x-ray imaging, wherein the means for detecting the second portion of the backscattered x-rays forms an outer loop defining an inner opening at which the means for x-ray imaging is configured to be received for attachment of the means for detecting the second portion with the means for x-ray imaging to form the attached arrangement.

20. An x-ray imaging kit comprising:

a movable x-ray imager including a first backscatter x-ray detector assembly; and a second backscatter x-ray detector assembly that is removably attachable with the movable x-ray imager; and complementary attachment features configured to secure, removably, the second backscatter x-ray detector assembly with the movable x-ray imager to form an attached arrangement having the second and first backscatter x-ray detector assemblies fixedly oriented with respect to each other, wherein the second backscatter x-ray detector assembly forms an outer loop defining an inner opening at which the movable x-ray imager is configured to be received for attachment of the second backscatter x-ray detector assembly with the movable x-ray imager to form the attached arrangement.

21. A method of x-ray imaging comprising:

scanning source x-rays over a target, using a movable x-ray imager including a first backscatter x-ray detector assembly;

attaching, removably, a second backscatter x-ray detector assembly with the movable x-ray imager to form an attached arrangement, the second backscatter detector assembly forming an outer loop defining an inner opening, wherein attaching includes the second backscatter x-ray detector assembly receiving, at the inner opening, the movable x-ray imager; and scanning source x-rays over the target or another target using the movable x-ray imager with the second backscatter x-ray detector assembly removably attached with the movable x-ray imager to form the attached arrangement.

* * * * *